US006554504B2

(12) United States Patent
Cook et al.

(10) Patent No.: US 6,554,504 B2
(45) Date of Patent: Apr. 29, 2003

(54) DISTRIBUTED DIGITAL FILM PROCESSING SYSTEM AND METHOD

(75) Inventors: Stacy S. Cook, Austin, TX (US); Leland A. Lester, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/777,396

(22) Filed: Feb. 5, 2001

(65) Prior Publication Data

US 2001/0036366 A1 Nov. 1, 2001

Related U.S. Application Data

(60) Provisional application No. 60/180,478, filed on Feb. 3, 2000, provisional application No. 60/180,483, filed on Feb. 3, 2000, provisional application No. 60/180,485, filed on Feb. 3, 2000, and provisional application No. 60/174,055, filed on Dec. 30, 1999.

(51) Int. Cl.[7] .............................................. G03D 13/00

(52) U.S. Cl. ....................... 396/567; 396/570; 396/639; 355/27; 355/40

(58) Field of Search ................................ 396/564, 604, 396/567–570, 626, 639; 355/27–29, 77, 40

(56) References Cited

U.S. PATENT DOCUMENTS

| 2,404,138 A | 7/1946 | Mayer | 95/94 |
|---|---|---|---|
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |

(List continued on next page.)

FOREIGN PATENT DOCUMENTS

| EP | 0 261 782 A2 | 8/1987 | H04N/1/46 |
|---|---|---|---|
| EP | 0 422 220 A1 | 3/1989 | A61B/6/03 |
| EP | 0 482 790 B1 | 9/1991 | H04N/1/40 |
| EP | 0 525 886 A3 | 7/1992 | G03D/5/00 |
| EP | 0 580 293 A1 | 6/1993 | H04N/1/04 |
| EP | 0 601 364 A1 | 6/1994 | H04N/1/387 |
| EP | 0 669 753 A1 | 2/1995 | H04N/1/407 |
| EP | 0 794 454 A2 | 2/1997 | G03B/27/73 |
| EP | 0 768 571 A2 | 4/1997 | G03D/13/00 |

(List continued on next page.)

OTHER PUBLICATIONS

"*Adaptative Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, pp. 546–550, 1994.

"*Anisotropic Spectral Magnitude Estimation Filters for Noise Reduction and Image Enhancement*", Aich, T., et al., Philips GmbH Research Laboratories, IEEE, pp. 335–338, 1996.

(List continued on next page.)

*Primary Examiner*—D. Rutledge
(74) *Attorney, Agent, or Firm*—Raymond M. Galasso; Simon, Galassot Frantz PLC

(57) ABSTRACT

Photo-images are read from film using a digital film processing (DFP) system, and then transmitted for processing, along with any necessary associated information. After processing, the images can be stored in a database or transmitted to an image delivery system, such as a personal computer or kiosk, where a print, negative, computer file, or other representation of the image is prepared for delivery to a customer. All or any part of the image processing, archival, manipulation, retrieval, and delivery systems and associated interfaces may reside on an Internet web site.

62 Claims, 9 Drawing Sheets

U.S. PATENT DOCUMENTS

| | | | |
|---|---|---|---|
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A * | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,799,219 A * | 8/1998 | Moghadam et al. | 396/556 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,017,157 A * | 1/2000 | Garfinkle et al. | 396/639 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,174,094 B1 * | 1/2001 | Manico et al. | 396/604 |
| 6,193,425 B1 * | 2/2001 | Edgar | 396/604 |
| 6,200,738 B1 | 3/2001 | Takano et al. | 430/362 |
| 6,222,607 B1 * | 4/2001 | Szajewski et al. | 396/567 |
| 6,283,646 B1 * | 9/2001 | Dellert et al. | 396/567 |

FOREIGN PATENT DOCUMENTS

| | | | | |
|---|---|---|---|---|
| EP | 0 806 861 A1 | 11/1997 | | H04N/1/00 |
| EP | 0 878 777 A2 | 11/1998 | | G06T/5/40 |
| EP | 0 930 498 A2 | 12/1998 | | G01N/21/88 |
| WO | WO 90/01240 | 2/1990 | | H04N/1/40 |
| WO | WO 91/09493 | 6/1991 | | H04N/5/217 |
| WO | WO 97/25652 | 7/1997 | | G03D/5/00 |
| WO | WO 98/19216 | 5/1998 | | G03C/5/29 |
| WO | WO 98/25399 | 6/1998 | | H04N/1/38 |
| WO | WO 98/31142 | 7/1998 | | H04N/5/253 |
| WO | WO 98/34157 | 8/1998 | | |
| WO | WO 98/34397 | 8/1998 | | |
| WO | WO 99/43148 | 8/1999 | | H04N/1/00 |
| WO | WO 99/43149 | 8/1999 | | H04N/1/100 |
| WO | WO 01/01197 | 1/2001 | | G03D/5/00 |
| WO | WO 01/13174 A1 | 2/2001 | | G03D/5/06 |
| WO | WO 01/45042 A1 | 6/2001 | | G06T/5/00 |

| WO | WO 01/50192 A1 | 7/2001 | ........... G03C/7/407 |
| WO | WO 01/50193 A1 | 7/2001 | ........... G03C/7/407 |
| WO | WO 01/50194 A1 | 7/2001 | ........... G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Application ", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

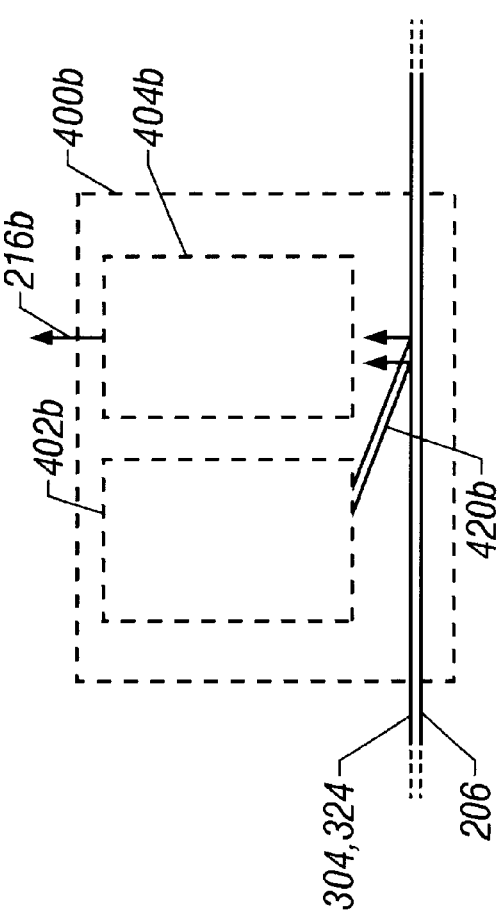
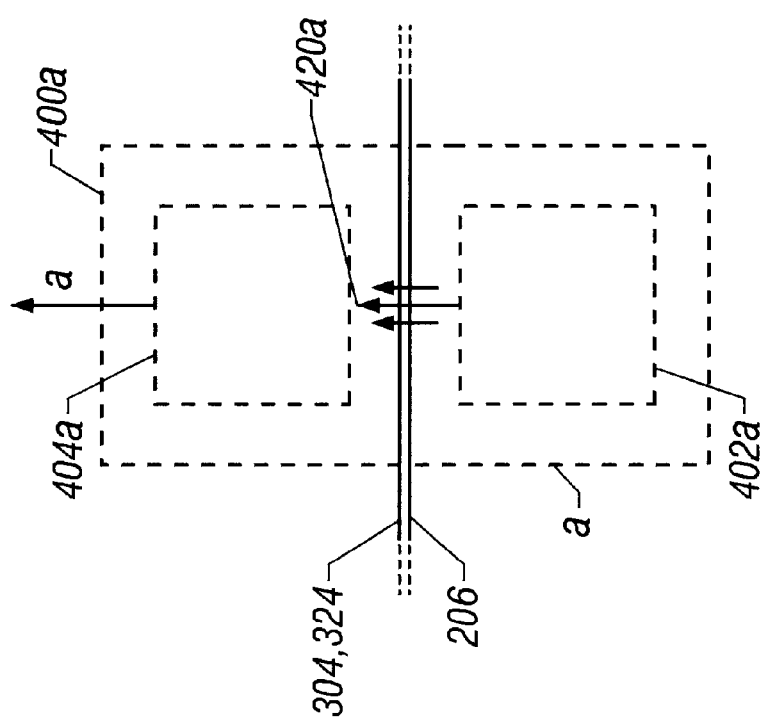
FIG. 4B-2
FIG. 4B-1

DISTRIBUTED DIGITAL FILM PROCESSING SYSTEM AND METHOD

RELATED APPLICATIONS

This application claims benefit under 35 U.S.C. §119(e) of United States Provisional Application Serial No. 60/180,478, entitled Method and System for Digital Film Processing, which was filed on Feb. 3, 2000; United States Provisional Application Serial No. 60/180,483, entitled Method, System and Database for Storing and Retrieving Electronic Images which was filed on Feb. 3, 2000; United States Provisional Application Serial No. 60/180,485, entitled Method, System, and Signal for Providing Internet Access to Images Resulting from Digital Film Processing which was filed on Feb. 3, 2000.

This application is related to the following copending United States Patent Applications: System and Method for Digital Film Development Using Visible Light, Provisional Application Serial No. 60/174,055, and having a priority filing date of Dec. 30, 1999.

FIELD OF THE INVENTION

The present invention relates generally to digital image processing methods and systems, and more particularly to a distributed digital film processing system and method.

BACKGROUND OF THE INVENTION

Images are used to communicate information and ideas. Images, including print pictures, film negatives, documents and the like, are often digitized to produce a digital image that can then be instantly communicated, viewed, enhanced, modified, printed or stored. The flexibility of digital images, as well as the ability to instantly communicate digital images, has led to a rising demand for improved systems and methods for film processing and the digitization of film based images into digital images. Film based images are traditionally digitized by electronically scanning a film negative or film positive that has been conventionally developed using a wet chemical developing process, as generally described below.

Conventional film processing generally involves the customer dropping off or sending a roll of exposed film to a film development lab for conventional wet chemistry development, and then returning at some later time to pick up the prints and the developed negatives. Conventional wet chemistry photo processing systems have evolved to the point that the film can be processed within one hour. However, even with the advent of one-hour photo processing, the process generally involves a high degree of customer inconvenience. For example, picking up the prints and developed negatives often requires a second trip and the photographic prints and negatives can only be picked up when an attendant or technician is on duty. Another problem is that the pictures are often developed in view of the public. This can create problems when sensitive pictures are developed, such as in the case of trade secrets or confidential information. In the case of mailing developed negatives and the prints to the customer, there is always a possibility that the prints or negatives could be damaged or lost during shipment.

Conventional film processing generally requires the customer to provide specific instructions as to the number of prints and any specialized requirements. These instructions cannot be changed and once the film has been developed, the film cannot be redeveloped. In addition, additional prints or modifications to the prints are requested after the customer has reviewed the prints. This requires the customer to provide the negatives and return at another time to pick-up the prints. In many cases, the instructions, such as lightening, cropping and the like, are not followed exactly or the customer is not fully satisfied. The customer must then go through another round changes. This is time intensive and inconvenient for the customer. Furthermore, conventional film processing systems and methods may not be able to accommodate some requests; even if a customer makes the requests at the time the film is developed. For example, a customer is unlikely to be able to receive both black and white and full color images from a single roll of film.

SUMMARY OF THE INVENTION

In accordance with one aspect of the invention, a digital film processing (DFP) system is provided. In one embodiment, the DFP system comprises an image capturing system enabled to record a plurality of electronic representations of an image formed on film, an image processing system capable of manipulating the electronic representations of an image formed on film to generate an electronic representation of a desired image, and at least one communications interface enabled to receive and transmit information (including information associated with the desired image).

In accordance with another aspect of the invention, a method for delivering images resulting from DFP is provided. In one embodiment, the method comprises recording a plurality of electronic representations of an image formed on a film, processing the plurality of electronic representations to generate an electronic representation of a desired image, and delivering the electronic representation of the desired image. At least one embodiment further comprises maintaining an Internet web page, through which users can provide input affecting processing, and receive electronic images. Yet another embodiment includes delivering images to a customer☐s e-mail account.

The present invention also provides a distributed digital film processing (DFP), image storage/retrieval, and image delivery system. The system comprises an imaging system capable of recording electronic representations of images formed on film, and of transmitting the electronic representations for processing, and an image processing system capable of receiving the transmitted electronic representations, manipulating the transmitted electronic representations to generate an electronic representation of a desired image, and transmitting the electronic representation of a desired image and information associated with the image for storage. The system also comprises a database enabled to store the electronic representation of a desired image, and transmit the electronic representation of a desired image for delivery. The system further comprises an image delivery system enabled to receive the electronic representation of a desired image, and to encode a physical medium with a representation of the desired image.

An advantage of at least one embodiment of the present invention is that a centralized processing location can be used to limit the cost of processing hardware needed to process electronic image information and to obtain more consistent processing quality. An advantage of at least one embodiment of the present invention is that users may control the delivery and some processing of their images through a user interface provided on an image delivery system. An additional advantage of at least one embodiment of the present invention is that users may archive electronic representations of their images for later retrieval and/or further processing. Yet another advantage of at least one embodiment of the present invention is that users may control the delivery and processing of their images through an Internet web site.

BRIEF DESCRIPTION OF THE DRAWINGS

For a more complete understanding of the invention and the advantages thereof, reference is now made to the following description taken in conjunction with the accompanying drawings, wherein like reference numerals represent like parts, in which:

FIGS. 3B-1–3B-4 are schematic diagrams illustrating various embodiments of a processing station shown in FIG. 3A;

FIGS. 4B-1–4B-4 are schematic diagrams illustrating various embodiments of a scanning station shown in FIG. 4A;

DETAILED DESCRIPTION OF THE INVENTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
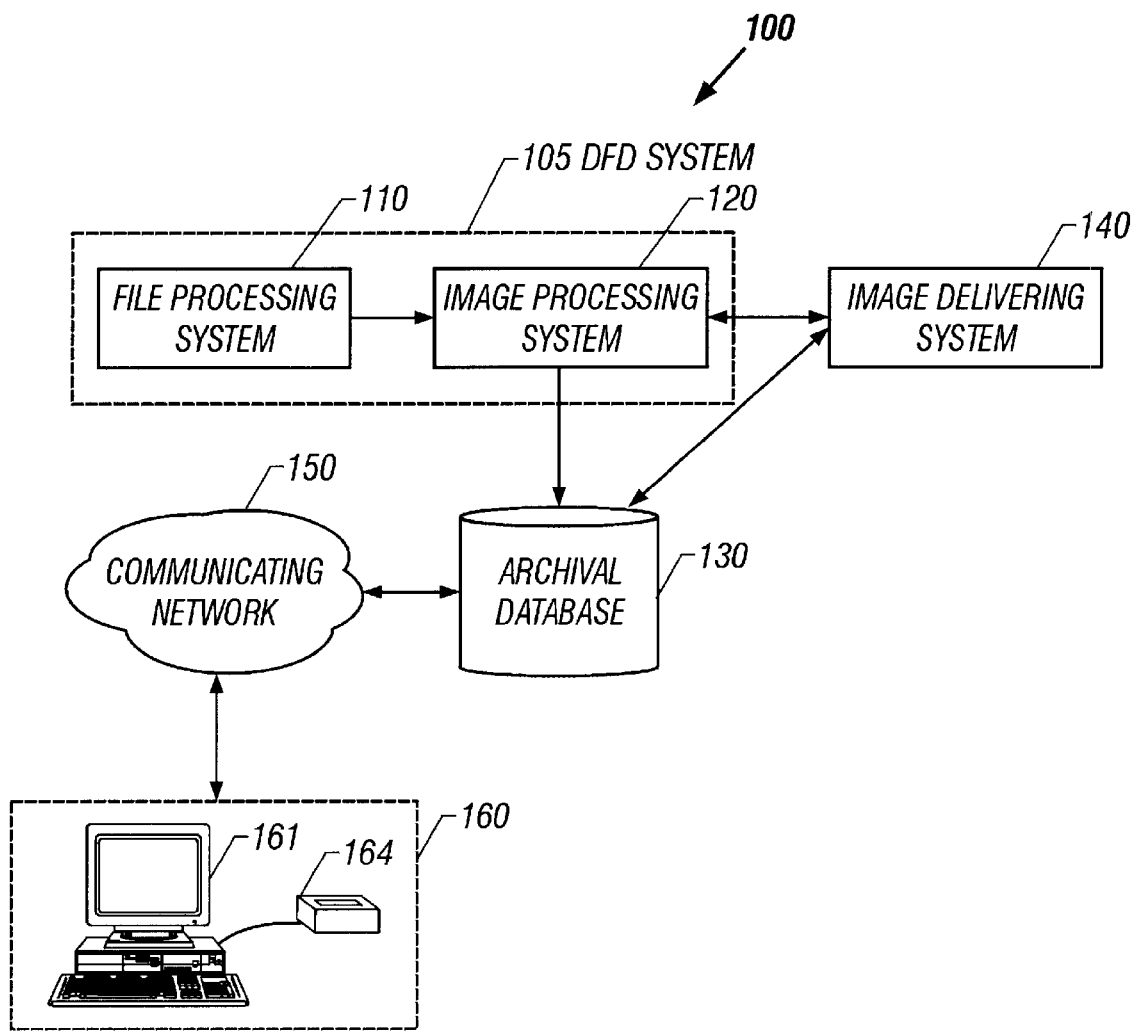
FIG. 1 is a block diagram of a distributed digital film processing (DFP) system in accordance with the invention.

FIG. 1 illustrates one embodiment of a distributed digital film processing (DFP) system 100 in accordance with the invention. Distributed system 100 comprises a digital film processing system 105, an archive/database 130, at least one image delivery system 140, a communication network 150, and may also include a remote access system 160.

As described later in the discussions of FIGS. 2–4, the digital film processing system 105 comprises a film processing system 110 and an image processing system 120. The film processing system 110 and the image processing system 120 work together to produce a digital image.

Archive/database 130 can be any type of standard electronic digital data storage and retrieval system, usually consisting of a processor controlled storage media. The control processor may be integral the storage system or separate, such as a personal computer or similar computing device. The storage media maybe electronic components, such as EEPROM, NVRAM, or RAM; conventional hard disk drive; CDROM residing in a multi-disk retrieval system; or based on any other high capacity digital storage strategy.

In one embodiment, archive/database 130 serves as a central clearing-house for raw image data receipt and delivery. Film processing system 110 transmits the raw image data recorded from film to archive/database 130. Archive/database 130 then stores and forwards the raw image data to image processing system 120. Preferably, communication between elements of distributed system 100 are carried out using high speed communication links such as those used in cable modems, digital subscriber links (DSL), fiber optic cable links, etc. In another embodiment, archive/database 130 operates to receive fully processed digital images from image processing system 120. It will be appreciated that a digital image received from any source may be stored in archive/database 130 and then routed to appropriate systems at a later time.

Archive/database 130 preferably transmits fully processed electronic representations of images and associated image information to image delivery system 140, or through communications network 150 to remote access system 160. In some embodiments of the present invention, archive/database 130 transmits information associated with an image in addition to transmitting the fully processed electronic image.

Image delivery system 140, in at least one embodiment of the present invention, is configured to receive digital images, and to encode a physical medium with these images. Encoding a physical medium may include recording a copy of the digital image onto a computer readable medium, such as a compact disc, a floppy disk, a hard drive, a digital video disk, a magnetic tape, etc. In other embodiments, encoding includes printing the image, using appropriate ink or dye, onto physical medium. For example, cyan, yellow, and magenta colored inks (subtractive colors) may be used to print negative images. Alternatively, red, blue, and green inks (additive colors) may be used to print positive images, such as photographic slides and prints.

The term "printing, " as used herein, refers not only to painting inks or dyes onto a physical medium, but also to other methods of forming an image on a medium. For example, the present invention may employ an ink-jet printer, thermal-transfer printer, a wax-printer, and a laser printer. In addition to (or in place of) these types of printers, one embodiment of the present invention exposes a color film to an image formed using a cathode-ray tube. The film is then developed, generating a negative film having an images formed thereon. This negative image can be nearly identical to the original image, or it may incorporate user designated changes to the image, such as brightening, darkening, cropping, filtering, enlarging, defect removal, etc. It will be appreciated that a customer interface can be provided as part of image delivery system 140, to enable customer input and feedback.

One embodiment of the present invention implements image delivery system 140 at the same physical location as image processing system 120, and so transmission occurs across a system bus or a local area network. In this embodiment, the image processing system 120 generally includes a user interface.

FIG. 1 also illustrates archive/database 130 transmitting to remote access system 160 via communication network 150. In a preferred embodiment, remote access system 160 is a personal computer 161 maintained by a consumer who desires to have images delivered to his computer in digital form. Remote access system 160 can be equipped with printing and encoding device 164 in much the same way as image delivery system 140. In one embodiment, remote access system 160 is equipped with a scanner (not illustrated). A photographic image, such as a photographic print or negative film, can be scanned, the information transmitted via communication network 150 to archive/database 130, which in turn transmits the information to image processing system 120. After processing, the modified image can be returned to remote access system 160, or to archive/database 130 for storage.

Instead of delivering images directly to remote access system 160, the images can be delivered via e-mail. In such a circumstance, a user operating remote access system 160, or any other information handling system connected to communication network 150, can retrieve the delivered digital images.

At least one embodiment of the present invention implements communication through a distributed digital film processing system Internet web site. As known to those skilled in the art, an Internet web site is a collection of web pages, usually linked through an index, or home page. Each web page is a file (a collection of programming instructions) configured to display a number of objects on a computer screen. Some of these objects are simple images used only for display. Other objects are configured such that when a user positions a pointing device, such as a mouse, over the object and "clicks" on the object, a series of instructions is carried out. These instructions may include printing, downloading files, linking to another Internet web page within the current Internet web site, or accessing another Internet web site.

The present invention preferably maintains an Internet web site in conjunction with archive/database 130. The combination of archive/database 130 and image delivery system 140 is referred to herein as a storage and retrieval system. One embodiment of the present invention preferably maintains at least one user interface in conjunction with a storage and retrieval system. Preferably, this user interface is maintained as a part of image delivery system 140. It should be noted, however, that the user interface and/or the Internet web site may be maintained with film processing system 110, image processing system 120, and/or archive/database 130. The user interface is configured to prompt users for information, accept user input, and respond to user commands and requests. The Internet web site is configured to accept user input from remote access system 160. Information input by users may include, but is not limited to, billing information, payment information, image identification information, address information, service selection options, archive information, processing options, etc.

An Internet web site and/or a user interface according to the present invention may also allow user selection of various processing options and services. Processing options can include generation of physical media such as negatives, slides, or prints, to be delivered to the customer via mail or otherwise. Other processing options include the application of various "filters" to alter the appearance of a processed image, non-standard color options (such as an image with no blue channel), and artifact removal (for example removing a reflection recorded in the original film image).

Services offered may include, but are not limited to, rush processing, physical media generation and/or delivery (including delivery to third parties for gifts, business advertisements, etc.), delivery of electronic images via the Internet and/or e-mail, archival of images, retrieval of images from archive, establishing accounts, payment on account, changing customer information, transferring images to another account, storage of information related to archived images, etc.

As is known in the art, a distributed database may store records (a collection of information fields) using multiple sub-databases. An entire record may be stored in one sub-database, or various fields within of a record may be stored in different sub-databases. For example, a sub-database in Dallas may be used to store a customer name field, and a customer billing status field, while another sub-database in Austin is used to store a customer order number field and an order status field. All of the fields may be part of a single customer record. If a customer attempts to access information concerning his account in Austin, the Austin sub-database retrieves any necessary information from the Dallas sub-database. By using a distributed archive/database structure, users are presented with a single interface for storing and retrieving data, while data may be stored in locations where it is most likely to be used. In addition, duplication of stored data can be reduced, or database redundancy can be implemented, without affecting the user's perception that all of the information is available from a single location.

Image data from any of the components of the distributed digital film processing system 100 may be transmitted as soon as it is available, or at some later time. In a preferred embodiment of the present invention, the image data may be stored temporarily for later transmission, when communications traffic may be light. By delaying the transmission, one may take advantage of lower off-peak communication rates, and minimize the occurrence of communication bottlenecks. It will also be appreciated that any information associated with the image data can be transmitted without departing from the spirit and scope of the present invention. Such information may include, but is not limited to, customer identification information, special processing requests, the time the film was deposited, the type of film, the location of the imaging system, and so on.

Digital film processing system 105 and image delivery system 140 may be implemented as subsystems of a single physical unit without departing from the spirit and scope of the present invention. Combining the two systems in such a way allows a single location to serve as a film drop-off point and a photograph pick-up point. Additionally, archive/database 130 may be implemented as part of any of the systems 110, 120, or 140, as determined to be useful by one implementing the present invention. It will also be appreciated that all of the systems 110, 120, 140 and 160 can store information associated with images locally, in addition to (or in place of) using archive/database 130 for image data storage consistent with the objectives of the present invention.

Figure 2:
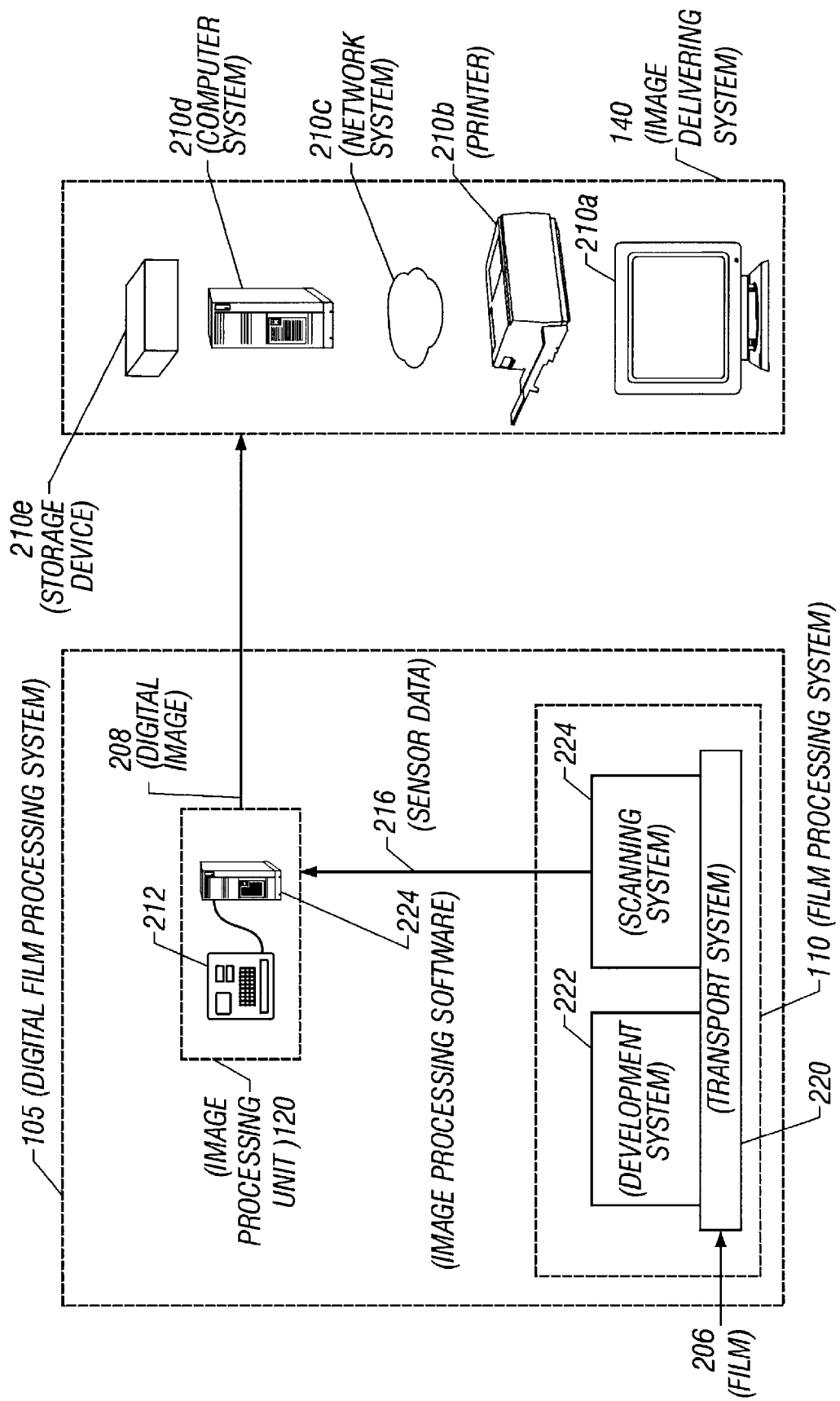
FIG. 2 is a block diagram of a digital film processing system in accordance with the invention.

FIG. 2 is an example of one embodiment of a digital film processing system 105. In this embodiment, the system 105 comprises an image processing system 120 and a film processing system 110 that operates to digitize a film 206 to produce a digital image 208 that can be output to an image delivery system 140. Film 206, as used herein, includes color, black and white, x-ray, infrared or any other type of film and is not meant to refer to any specific type of film or a specific manufacturer.

Image processing system 120 comprises any type of computer or processor operable to process data. For example, image processing system 120 may comprise a personal computer manufactured by Apple Computing, Inc. of Cupertino, Calif. or International Business Machines of New York. Image processing system 120 may also comprise any number of computers or individual processors, such as application specific integrated circuits (ASICs). In one embodiment, the image processing system 120 is coupled directly to the film processing system 110. In this embodiment, high data transfer rates can be achieved to allow image processing system 120 to process the sensor data 216 and produce the digital image 208 in a minimum amount of time. In another embodiment, the image processing system 120 is remote to the film processing system 110. In this embodiment, the sensor data 216 is transmitted over a communications network, such as the Internet, to the film processing system 110. Although this adds to the time and complexity to the production of the digital image 208, a single image processing system 120 can support multiple film processing systems 110. As a result, the cost is reduced and software upgrades can be easily implemented.

The image processing system 120 may include a user interface 212 operable to allow a user to input information into the system 105. The user interface 212 may include any suitable input device, such as a keypad, point-of-sale device, voice recognition system, memory reading device such as a flash card reader, money changer, bar code reader, and the like. The user interface 212 allows the customer to enter payment, make image enhancement choices regarding the digital images 208, print the digital images 208, add information, email the digital images 208, or interact with the image processing system 120 in any suitable manner.

Image processing system 120 includes image processing software 214 resident on the image processing system 120. Image processing system 120 receives sensor data 216 from film processing system 110. As described in greater detail below, sensor data 216 is representative of the image data and silver in the film 206 at each discrete location, or pixel, of the film 206. The sensor data 216 is processed by image processing software 214 to produce the digital image 208. The specific embodiment of the image processing software 214 is dependent upon the embodiment of the film processing system 110, and in particular, the specific embodiment of the scanning system, as described below. In an embodiment in which metallic silver grains and/or silver halide remains within the film 206, the image processing software 214 operates to compensate for the silver in the film 206. For example, one embodiment of image processing software 214 comprises software based on U.S. patent application Ser. No. 08/999,421, entitled Defect Channel Nulling, which is incorporated herein by reference. In this embodiment, any silver remaining in the film 206 is treated as a defect and each individual pixel color record is compensated to remove the effect of the silver. In an embodiment in which the metallic silver grains and silver halide have been modified to a substantially transparent silver compound, the film 206 may be scanned using only visible light without digitally compensating for any occlusions. Processing the film 206 without washing the silver from film 206 substantially reduces or eliminates the production of hazardous chemical effluents that are generally produced during conventional film processing methods. Although the image processing software 214 is described in terms of actual software, the image processing software 214 may be embodied as hardware, such as an ASIC. The color records for each pixel form the digital image 208, which is then communicated to one or more output devices 210.

Image delivery system 140 may comprise any type or combination of suitable devices for displaying, storing, printing, transmitting or otherwise outputting the digital image 208. For example, as illustrated, image delivery system 140 may comprise a display 210*a*, a printer 210*b*, a network system 210*c*, a mass storage device 210*d*, a computer system 210*e*, or any other suitable output device. The image deliver system 140 may also comprise an input device for a customer to input user information. Network system 218*c* may be any network system, such as the Internet, a local area network, and the like. Mass storage device 210*d* may be a magnetic or optical storage device, such as a floppy drive, hard drive, removable hard drive, optical drive, CD-ROM drive, and the like. Computer system 210*e* may be used to further process or enhance the digital image 208.

As described in greater detail below, film processing system 110 operates electronically scan the film 206 to produce the sensor data 216. Light used to scan the film 206 may include light within the visible portion of the electromagnetic spectrum, light within the infrared portion of the electromagnetic spectrum, a combination of visible and infrared light, or any other suitable electromagnetic radiation. As illustrated, film processing system 110 comprises a transport system 220, a development system 222, and a scanning system 224. Although the system 105 is illustrated with a development system 222, alternative embodiments of the system 105 do not require the development system 222. For example, film 206 may have been preprocessed and not require the development process described below.

Transport system 220 operates to dispense and move the film 206 through the film processing system 110. In a preferred embodiment, the transport system 220 comprises a leader transport system in which a leader is spliced to the film 206 and a series of rollers advances the film 206 through the film processing system 110, with care taken that the image surface of the film 206 is not contacted. Similar transport systems 220 are found in film products manufactured by, for example, Noritsu Koki Co. of Wakayama, Japan, and are available to those in the art.

Figure 3A:
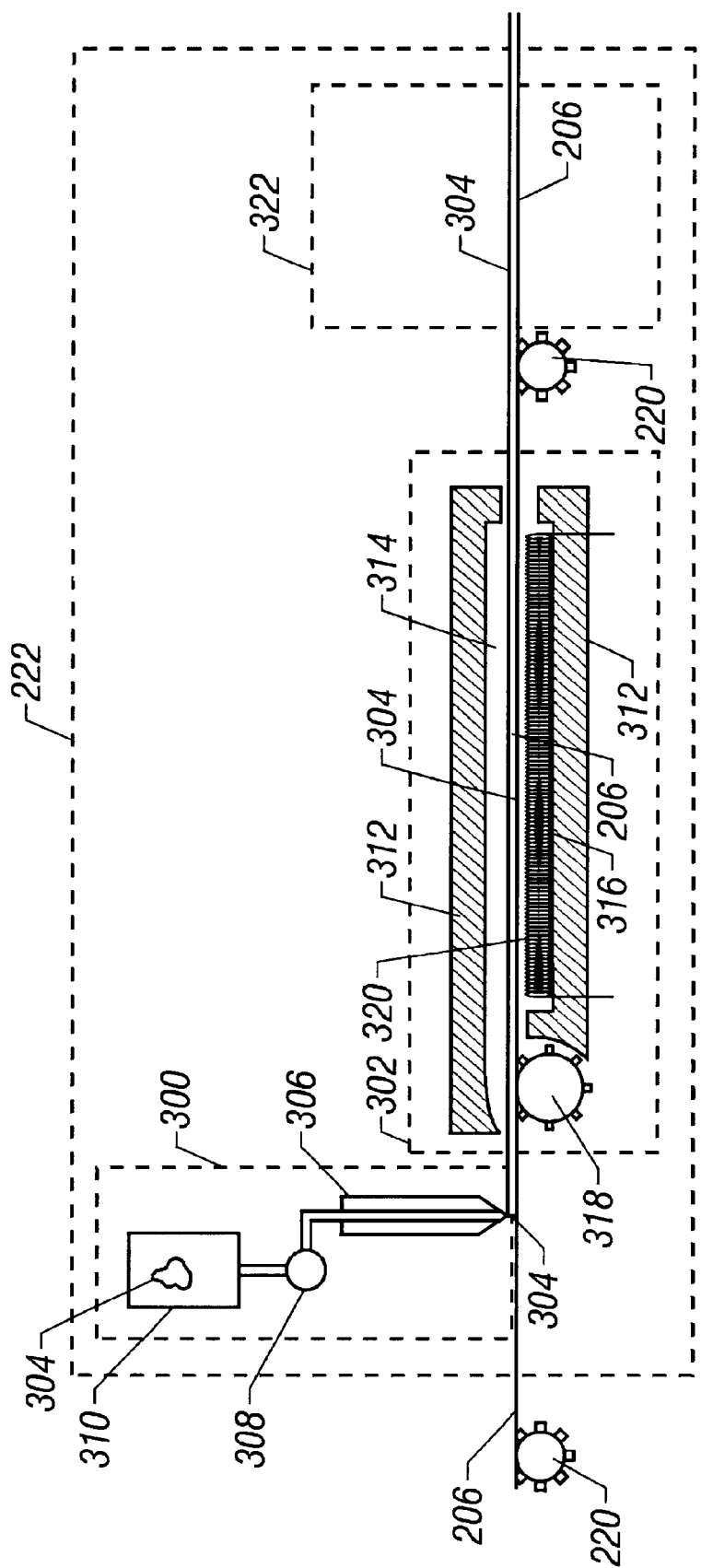
FIG. 3A is a schematic diagram illustrating a development system as shown in FIG. 2.

The development system 222 operates to apply one or more processing solutions to the film and develop the film 206, as described in greater detail in FIG. 3A. In the preferred embodiment, the processing solution comprises a viscous color developer solution that initiates production of the metallic silver grains and the magenta, cyan and yellow dye images within the film 206. In an alternative embodiment, the processing solution comprises a black and white developer solution that initiates production of the metallic silver grains within the film 206. The processing solution may include other suitable processing solutions. The development system 222 may also apply other suitable processing solutions, such as stop solutions, inhibitors, accelerators, bleach solutions, fixer solutions, blix solutions (combines the functionality of a bleach solution and a fixer solution), stabilizers and the like.

Figure 4A:
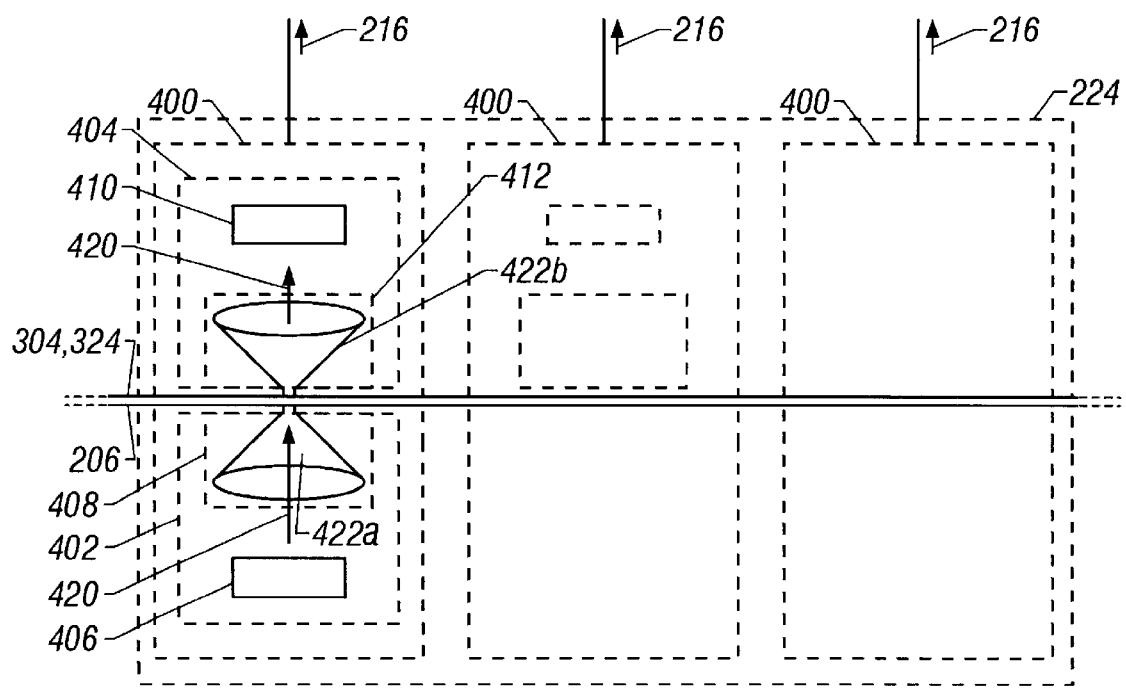
FIG. 4A is a schematic diagram illustrating a scanning system shown in FIG. 2.

The scanning system 224 scans the film 206 through the processing solutions applied to the film 206, as described in greater detail in FIG. 4A. In other words, the processing solutions are not substantially removed from the film 206 prior to the scanning process. In contrast, conventional film processing systems wash the contaminated processing solutions and hazardous silver compounds from the film and then dry the film to create a conventional film negative prior to any digitization process. The scanning station 224 may comprise a number of different configurations depending, in part, on how the film 206 was developed. In general, specific colors of visible light interact with the dye images and any silver present in the film 206, and infrared light interacts with the silver in the film 206. In some embodiments of the development system 222, the silver (metallic silver and/or silver halide) is modified to reduce the optical effects of the silver. For example, a bleaching agent may be applied to the film 206. The bleaching agent operates to oxidize the metallic silver grains within the film 206 to produce silver halide. The silver halide has a lower optical density than the metallic silver grains. As a result, a greater amount of light is transmitted through the film 206. Another example is a fixer agent. A fixer agent dissolves the silver halide to produce a silver compound that is substantially transparent to light. As a result, light is readily transmitted through the film 206.

The scanning station 224 scans the film 206 using electromagnetic radiation and produces sensor data 216 representative of the film image data, as described in greater detail in FIG. 4A. In the preferred embodiment of the scanning station 224, the film 206 is scanned with light within the visible and infrared portions of the electromagnetic spectrum. The visible light measures the light intensity associated with the dye clouds as well as the silver within the film 206, and the infrared light measures the light intensity associated with the metallic silver grains within the film 206. In particular, one or more bands of visible light may be used to scan the film 206. For example, the film 206 may be scanned using visible light within the red, green and/or blue portions of the electromagnetic radiation spectrum. In other embodiments of the scanning station 224, the film 206 is scanned with only visible light, with only infrared light, with different combinations of visible light, or any other suitable electromagnetic radiation. The processing solutions are not substantially removed prior to scanning the film 206. In contrast, conventional film processing systems wash all the processing solutions and silver, both silver halide and metallic silver, from the film 206 prior to any conventional scanning processes. Silver, whether metallic silver or silver halide crystals, in the film negative interferes with the transmission of light through the film negative and would be digitized along with the image. Any silver in the film negative would appear as defects in the resulting digital image.

In operation, exposed, but undeveloped film 206 is fed into the transport system 220. The film 206 is transported through the development system 222. The development system 222 applies a processing solution to the film 206 that develops the film 206. The transport system 220 moves the film 206 through the scanning system 224. The scanning system 224 illuminates the film 206 with light. Light from the film 206 is measured by the sensor system, which produces sensor data 216. The sensor data 216 represents film image data in the film 206 at each pixel. The sensor data 216 is communicated to image processing system 120. The image processing system 120 processes the sensor data 216 using image processing software 214 to produce the digital image 208. The image processing system 120 may also operate to enhance or otherwise modify the digital image 208. For example, the digital image 208 may be modified in accordance with input from the user. The image processing system 120 communicates the digital image 208 to the image delivery system 140 for viewing, storage, printing, communicating, or any combination of the above.

In a particular embodiment of the digital film development system 105 the system 105 is adapted to a self service film processing system, such as a kiosk. Such a self service film processing system is uniquely suited to new locations because no plumbing is required to operate the self service film processing system. In addition, the developed images can be prescreened by the user before they are printed, thereby reducing costs and improving user satisfaction. In addition, the self service film processing system can be packaged in a relatively small size to reduce the amount of floor space required. As a result of these advantages, a self service film processing system can be located in hotels, college dorms, airports, copy centers, or any other suitable location. In other embodiments, the system 105 may be used for commercial film lab processing applications. Again, because there is no plumbing and the environmental impact of processing the film 206 is substantially reduced or eliminated, the installation cost and the legal liability for operating such a film lab is reduced. The system 105 can be adapted to any suitable application without departing from the scope and spirit of the invention.

FIG. 3A illustrates one embodiment of the development system 222. In this preferred embodiment, a development system 222a comprises an applicator station 300 and a development station 302. The applicator station 300 operates to apply a relatively uniform coating of a processing solution 304 to the film 206. In one embodiment, the processing solution 304 comprises a color developer solution, such as Flexicolor Developer for Process C-41 available from the Eastman Kodak Company. In other embodiments, the processing solution 304 comprises other suitable solutions. For example, the processing solution 304 may comprise a monobath solution that acts as a developer and stop solution.

In a particular embodiment, the applicator station 300 comprises an applicator 306, a fluid delivery system 308, and a reservoir 310. The applicator 306 operates to coat the film 306 with the processing solution 304. In the preferred embodiment, as illustrated, the applicator 306 comprises a slot coater device. In alternative embodiments, the applicator 306 comprises an ink jet applicator, a tank, an aerosol applicator, drip applicator, sponge applicator, or any other suitable device for applying the processing solution 304 to the film 206. The fluid delivery system 308 delivers the processing solution 304 from the reservoir 310 to the applicator 306. In an embodiment in which the applicator 306 comprises a slot coater device, the fluid delivery system 308 generally delivers the processing solution 304 at a constant volumetric flow rate to help insure uniformity of coating of processing solution 304 on the film 206. The reservoir 310 contains a sufficient volume of processing solution 304 to process multiple rolls of film 206. In the preferred embodiment, the reservoir 210 comprises a replaceable cartridge. In other embodiments, the reservoir 310 comprises a refillable tank. The applicator station 300 may comprise other suitable systems and devices for applying the processing solution 304 to the film 206.

The development station 302 operates to give the film 206 time to develop prior to being scanned by the scanning system 224. In the embodiment illustrated, the development station 302 forms that portion of the transport system 220 between the applicator 306 and the scanning system 224. The length of the development station 302 is generally dependent upon the development time of the film 206. In particular, depending upon the environment and chemical nature of the processing solution 304, development of the film 206 may require as little as a few seconds to as long as several minutes.

As illustrated, the development station 302 comprises a cover 312 that protects the film 206 during development. The cover 312 forms an environmental chamber 314 surrounding the film 206. The temperature and humidity within the environmental chamber 314 are strictly controlled. To facilitate controlling the temperature and humidity, the environmental chamber 314 has a minimum volume surrounding the film 206. The cover 312 may be insulated to maintain a substantially constant temperature as the film 206 is developed. In order to maintain the temperature, the development station 302 preferably includes a heating system 316. As illustrated, the heating system 316 may include a heated roller 318 and heating element 320. In addition, the heating system 316 may include a processing solution heating system (not expressly shown) that heats the processing solution 304 prior to its application to the film 206.

Figures 1, 3B:
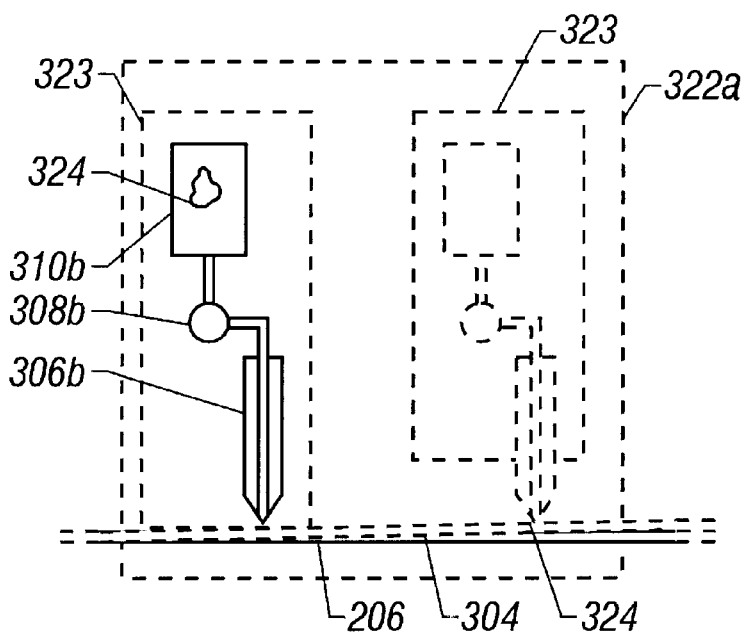
Figures 2, 3B:
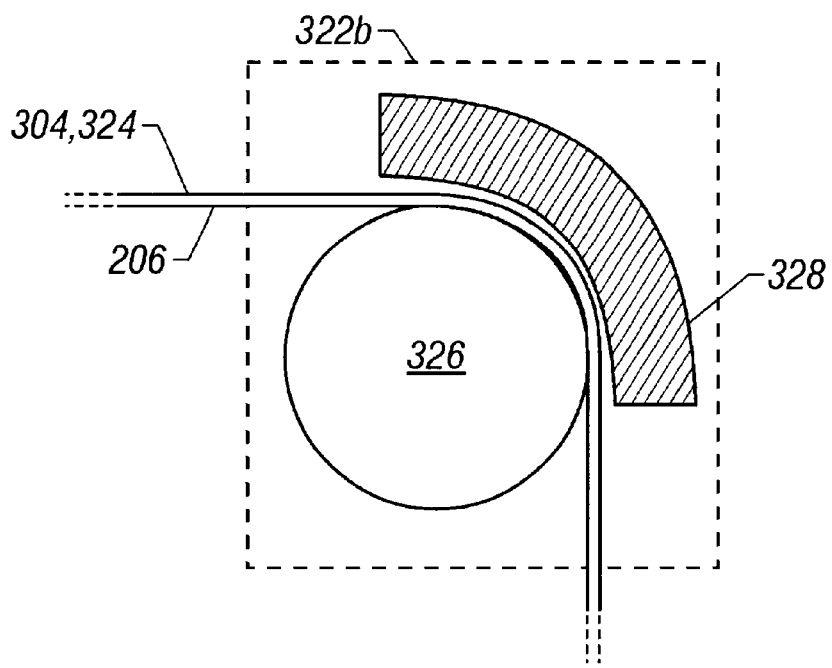

In an alternative embodiment, the development system 222 includes a processing station 322. The processing station 322 operates to further process the film 206 prior to being scanned by the scanning system 224. For example, in on embodiment, the processing station 322 operates to modify the metallic silver grains and or silver halide in the film 206. Modifying the silver within the film 206 decreases the opacity of the film 206, thereby improving the transmissivity of light through the film 206. In another embodiment, the processing station 322 operates to retard or substantially reduce the continued development of the film 206. Retarding or substantially stopping the continued development of the film 206 increases the amount of time the film 206 can be exposed to visible light without substantially fogging of the film 206. In another embodiment, the processing station 322 operates to modify the silver and also substantially reduce the continued development of the film 206. FIGS. 3B-1–3B4 illustrate different examples of the processing station 322.

In operation, transport system 220 transports the film 206 through the applicator station 300. Fluid delivery system 308 dispenses the processing solution 304 from the reservoir 310 through the applicator 306 onto the film 206. The processing solution 304 initiates development of the dye image and silver image within the film 206. The coated film 206 is then transported through the development station 302. As discussed above, the development station 302 allows the film 206 time to develop within a controlled environment. In an alternative embodiment, the film 206 is then transported through the processing station 322 where the film 206 is further processed. The film 206 is then transported by the transport system 220 to the scanning system 224. As described above, the processing solution 304 coated on the film 206 is not substantially removed, but remains on the film 206 as the film 206 is transported to the scanning system 224.

FIG. 3B-1 illustrates one embodiment of a processing station 322a. The processing station 322a comprises one or more applicator stations 323 that operate to apply one or more processing solutions 324 to the film 206. As illustrated, the applicator station 323 comprises an applicator 306b, a fluid delivery system 308b, and a reservoir 310b, similar in function and design as applicator station 300 described in FIG. 3A. The processing station 322a may comprise any number of applicator stations 323 as required to apply suitable processing solutions 324 to the film 206.

The processing solution 324 may comprise any suitable chemical applied to the film 206 to further process the film 206. In one embodiment, the processing solution 324 includes a fixing agent. As discussed previously, the fixing agent dissolves the silver halide into a substantially transparent silver compound. This has the effect of slightly reducing the opacity of the film 206, but substantially eliminating the sensitivity of the film 206 to any type of light. In another embodiment, the processing solution 324 includes a bleaching agent. The bleaching agent converts the metallic silver within the film 206 into silver halide. As a result, the opacity of the film 206 is greatly reduced, but the sensitivity of the film 206 to light is not substantially reduced. In yet another embodiment, both a bleaching agent and a fixing agent are applied to the film 206, individually or as a mixture referred to as blix (combines functions of a bleaching and fixing) is applied to the film 206. This has the effect of substantially reducing the opacity of the film 206 and also substantially reducing the sensitivity of the film 206 to light. The processing solution 324 may also include an aqueous solution, stop solution, stabilizer solution, or any other suitable film processing solution without departing from the scope of the invention.

FIG. 3B-2 illustrates a processing station 322b that operates to chill the developing film 206. Chilling the developing film 206 substantially slows the chemical developing action of the processing solution 204. In the embodiment illustrated, the processing station 322b comprises an electrical cooling roller 326 and insulation shield 328. In this embodiment, the cooling roller 326 is electronically maintained at a cool temperature that substantially arrests the chemical reaction of the processing solution 304. The insulation shield 328 substantially reduces the environmental heat transfer to the cooling roller 326. The processing station 322b may comprise any other suitable system and device for chilling the developing film 206.

Figures 3, 3B:
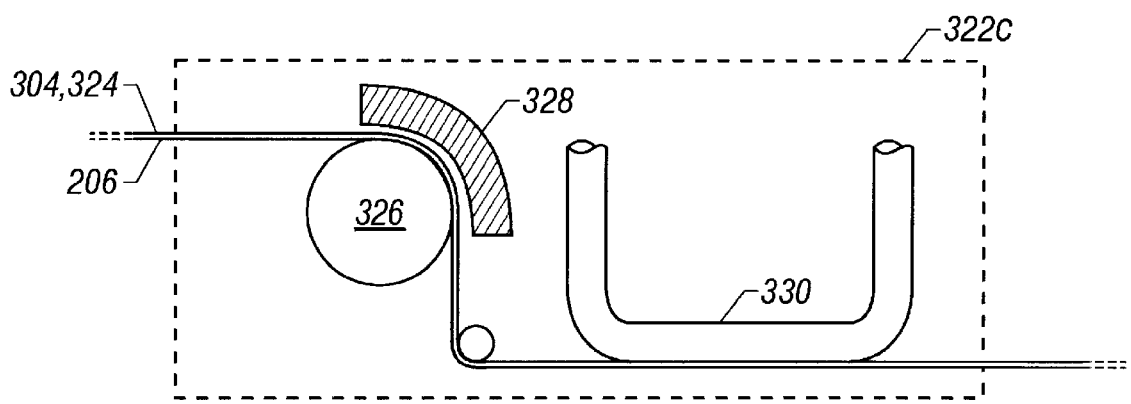

FIG. 3B-3 illustrates a processing station 322c that operates to dry the processing solution 304 on the coated film 206. Drying the processing solution 304 substantially stops further development of the film 206 and may also decrease the opacity of the film 206. In the embodiment illustrated, the processing station 322c comprises an optional cooling roller 326, as described in FIG. 3B-2, and a drying system 330. Although heating the coated film 206 would facilitate drying the processing solution 304, the higher temperature would also have the effect of accelerating the chemical reaction of the processing solution 304 and film 206. Accordingly, in the preferred embodiment, the film 206 is cooled to retard the chemical action of the processing solution 304 and then dried to effectively freeze-dry the coated film 206. Although chilling the film 206 is preferred, heating the film 206 to dry the film 206 can also be accomplished by incorporating the accelerated action of the processing solution 304 into the development time for the film 206. In another embodiment in which a suitable processing solution 324 is applied to the film 206, the chemical action of the processing solution 304 is already minimized and the film 206 can be dried using heat without substantially effecting the development of the film 206. As illustrated, the drying system 330 circulates air over the film 206 to dry the processing solution 304 and depending upon the embodiment, the processing solution 324 onto the film 206. The processing station 322c may comprise any other suitable system for drying the film 206.

Figures 3, 3B, 4:
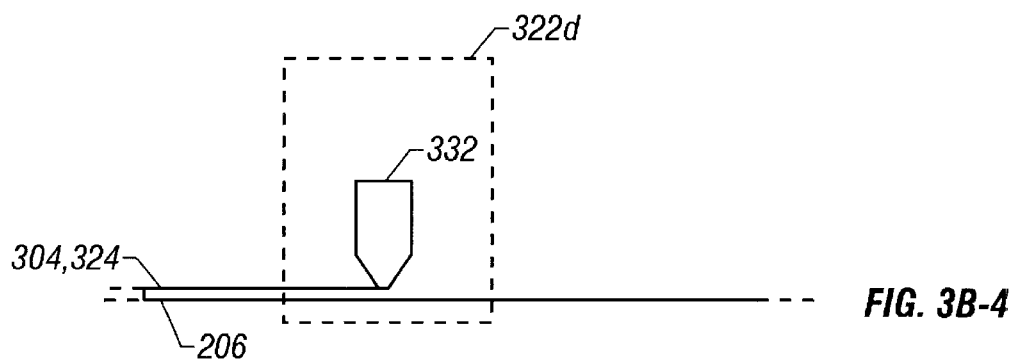

FIG. 3B-4 illustrates a processing station 322d that operates to substantially remove excess processing solution 304, and any excess processing solution 324, from the film 206. The processing station 322d does not remove the solutions 304, 324 that are absorbed into the film 206. In other words, even after the wiping action, the film 206 includes some processing solutions 304, 324, and does not substantially remove any silver compounds within the film 206. Removing any excess processing solution 304 will retard the continued development of the film 206. In addition, wiping any excess processing solutions 304, 324 from the film 206 may improve the light reflectance and transmissivity properties of the coated film 206. In particular, removal of the excess processing solutions 304, 324 may reduce any surface irregularities in the coating surface, which can degrade the scanning operation. In the embodiment illustrated, the processing station 322d comprises a wiper 332 operable to substantially remove excess processing solution 304 and any processing solution 324. In a particular embodiment, the wiper 332 includes an absorbent material that wicks away the excess processing solutions 304, 324. In another embodiment, the wiper 332 comprises a squeegee that mechanically removes substantially all the excess processing solutions 304, 324. The processing station 322d may comprise any suitable device or system operable to substantially remove any excess processing solutions 304, 324.

Although specific embodiments of the processing station 322 have been described above, the processing station 322 may comprise any suitable device or system for further processing the film 206. In particular, the processing station 322 may comprise any suitable combination of the above embodiments. For example, the processing station 322 may comprise an applicator station 300b for applying a halt solution 324, a cooling roller 326, and a drying system 330. As another example, the processing station 322 may comprise a wiper 332 and a drying system 330.

FIG. 4A illustrates one embodiment of the scanning system 224. Scanning system 224 comprises one or more scanning stations 400. Individual scanning stations 400 may have the same or different architectures and embodiments. Each scanning station 400 comprises a lighting system 402 and a sensor system 404. The lighting system 402 includes one or more light sources 406 and optional optics 408. The sensor system 404 includes one or more detectors 410 and optional optics 412. In operation, the lighting system 402 operates to produce suitable light 420 that is directed onto the film 206. The sensor system 404 operates to measure the light 420 from the film 206 and produce sensor data 216 that is communicated to the to the image processing system 120.

Each scanning station 400 utilizes electromagnetic radiation, i.e., light, to scan the film 206. Individual scanning stations 400 may have different architectures and scan the film 206 using different colors, or frequency bands (wavelengths), and color combinations. In particular, different colors of light interact differently with the film 206. Visible light interacts with the dye image and silver within the film 206. Whereas, infrared light interacts with the silver, but the dye image is generally transparent to infrared light. The term "color " is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 400 may utilize other suitable colors and wavelengths (frequency) ranges without departing from the spirit and scope of the invention.

The light source 406 may comprise one or more devices or a system that produces suitable light 420. In the preferred embodiment, the light source 406 comprises an array of light-emitting diodes (LEDs). In this embodiment, different LEDs within the array may be used to produce different colors of light 420, including infrared light. In particular, specific colors of LEDs can be controlled to produce short duration pulses of light 420. In another embodiment, the light source 406 comprises a broad spectrum light source 406, such as a fluorescent, incandescent, tungsten-halogen, direct gas discharge lamps, and the like. In this embodiment, the sensor system 404 may include filters for spectrally separating the colors of light 420 from the film 206. For example, as described below, a RGB filtered trilinear array of detectors may be used to spectrally separate the light 420 from the film 206. In another embodiment of a broad-spectrum light source, the light source 406 includes a filter, such as a color wheel, to produce the specified colors of light 420. In yet another embodiment, the light source 406 comprises a point light source, such as a laser. For example, the point light source may be a gallium arsenide or an indium gallium phosphide laser. In this embodiment, the width of the laser beam is preferably the same size as a pixel on the film 206 (~12 microns). Filters, such as a color wheel, or other suitable wavelength modifiers or limiters maybe used to provide the specified color or colors of light 420.

Optional optics 408 for the lighting system 402 directs the light 420 to the film 206. In the preferred embodiment, the optics 408 comprises a waveguide that directs the light 420 onto the film 206. In other embodiment, the optics 408 includes a lens system for focusing the light 420. In a particular embodiment, the lens system includes a polarizing filter to condition the light 420. The optics 408 may also include a light baffle 422a. The light baffle 422a constrains illumination of the light 420 within a scan area in order to reduce light leakage that could cause fogging of the film 206. In one embodiment, the light baffle 422a comprises a coated member adjacent the film 206. The coating is generally a light absorbing material to prevent reflecting light 420 that could cause fogging of the film 206.

The detector 410 comprises one or more photodetectors that convert light 420 from the film 206 into data signals 216. In the preferred embodiment, the detector 410 comprises a linear charge coupled device (CCD) array. In another embodiment, the detector 410 comprises an area array. The detector 410 may also comprise a photodiode, phototransistor, photoresistor, and the like. In addition, the detector 410 may utilize time delay integration (TDI) to improve the accuracy detector 410. The detector 410 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 420. Other suitable types of filters may be used. For example, a hot mirror and a cold mirror can be used to separate infrared light from visible light.

Optional optics 412 for the sensor system 404 directs the light 420 from the film 206 onto the detector 410. In the preferred embodiment, the optics 412 comprises a lens system that directs the light 420 from the film 206 onto the detector 410. In a particular embodiment, the optics 412 include polarized lenses. The optics 412 may also include a light baffle 422b. The light baffle 422b is similar in function to light baffle 422a to help prevent fogging of the film 206.

As discussed previously, individual scanning stations 400 may have different architectures. For example, light 420 sensed by the sensor system 404 may be transmitted light or reflected light. Light 420 reflected from the film 206 is generally representative of the emulsion layer on the same side of the film 206 as the sensor system 404. Specifically, light 420 reflected from the front side (emulsion side) of the film 206 represents the blue sensitive layer and light 420 reflected from the back side of the film 206 represents the red sensitive layer. Light 420 transmitted through the film 206 collects information from all layers of the film 206. Different colors of light 420 are used to measure different characteristics of the film 206. For example, visible light interacts with the dye image and silver within the film 206, and infrared light interacts with the silver in the film 206.

Different architectures and embodiments of the scanning station 400 may scan the film 206 differently. In particular, the lighting system 402 and sensor system 404 operate in concert to illuminate and sense the light 420 from the film 206 to produce suitable sensor data 216. In one embodiment, the lighting system 402 separately applies distinct colors of light 420 to the film 206. In this embodiment, the sensor system 404 generally comprises a non-filtered detector 410 that measures in series the corresponding colors of light 420 from the film 206. In another embodiment, multiple unique color combinations are simultaneously applied to the film 206, and individual color records are derived from the sensor data 216. In another embodiment, the lighting system 402 simultaneously applies multiple colors of light 420 to the film 206. In this embodiment, the sensor system 404 generally comprises a filtered detector 410 that allows the simultaneous measurement of individual colors of light 420. Other suitable scanning methods may be used to obtain the required color records.

The use of the processing station 322 may improve the scanning properties of the film 206 in addition to retarding or substantially stopping the continued development of the film 206. For example, the amount of light 420 transmitted through the film 206 is negatively effected by the opacity of the film 206. In other words, the greater the opacity of the film 206 the lower the amount of light 420 transmitted through the film 206. Both the silver image and silver halide within the film 206 occlude light 420. On the whole, the silver image within the film 206 absorbs light 420, and the silver halide reflects light 420. As described above, the processing solutions 324 may be used to modify opacity of the film 206 and improve the scanning properties of the film 206.

Figures 3, 4B:
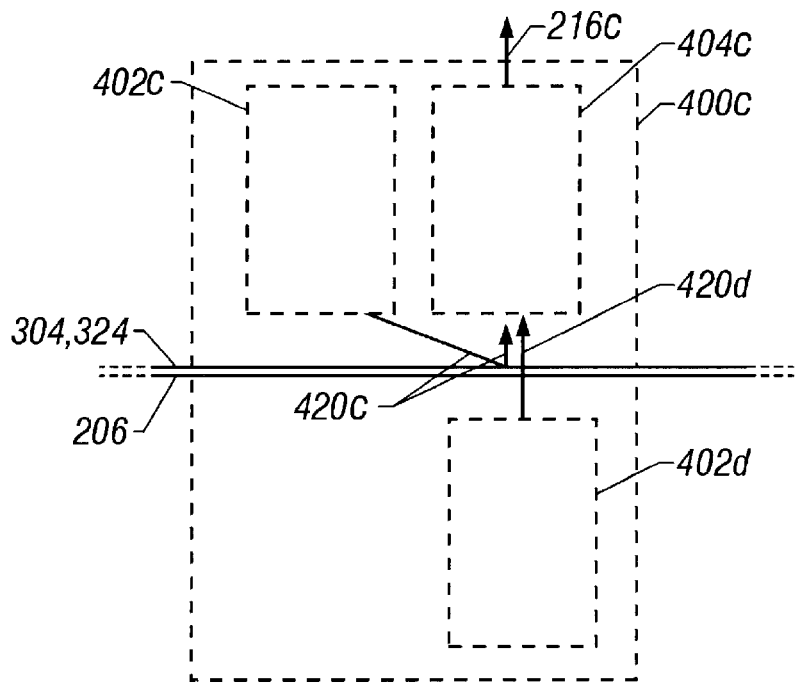
Figures 4, 4B:
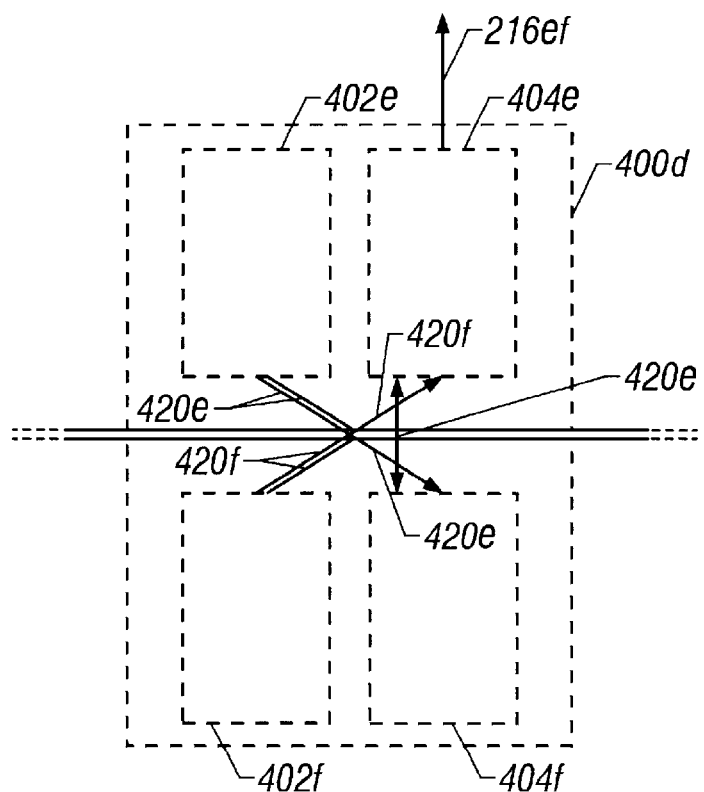
Figure 5:
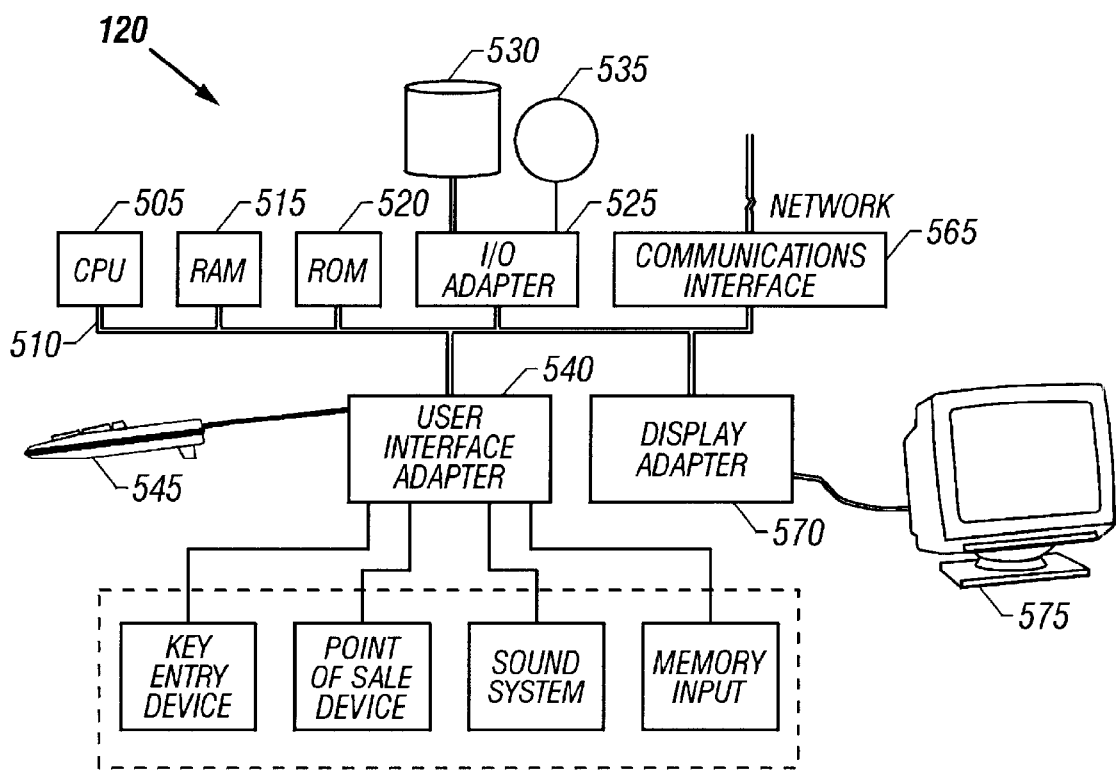
FIG. 5 is a block diagram of an image processing system shown in FIG. 1.
Figure 6:
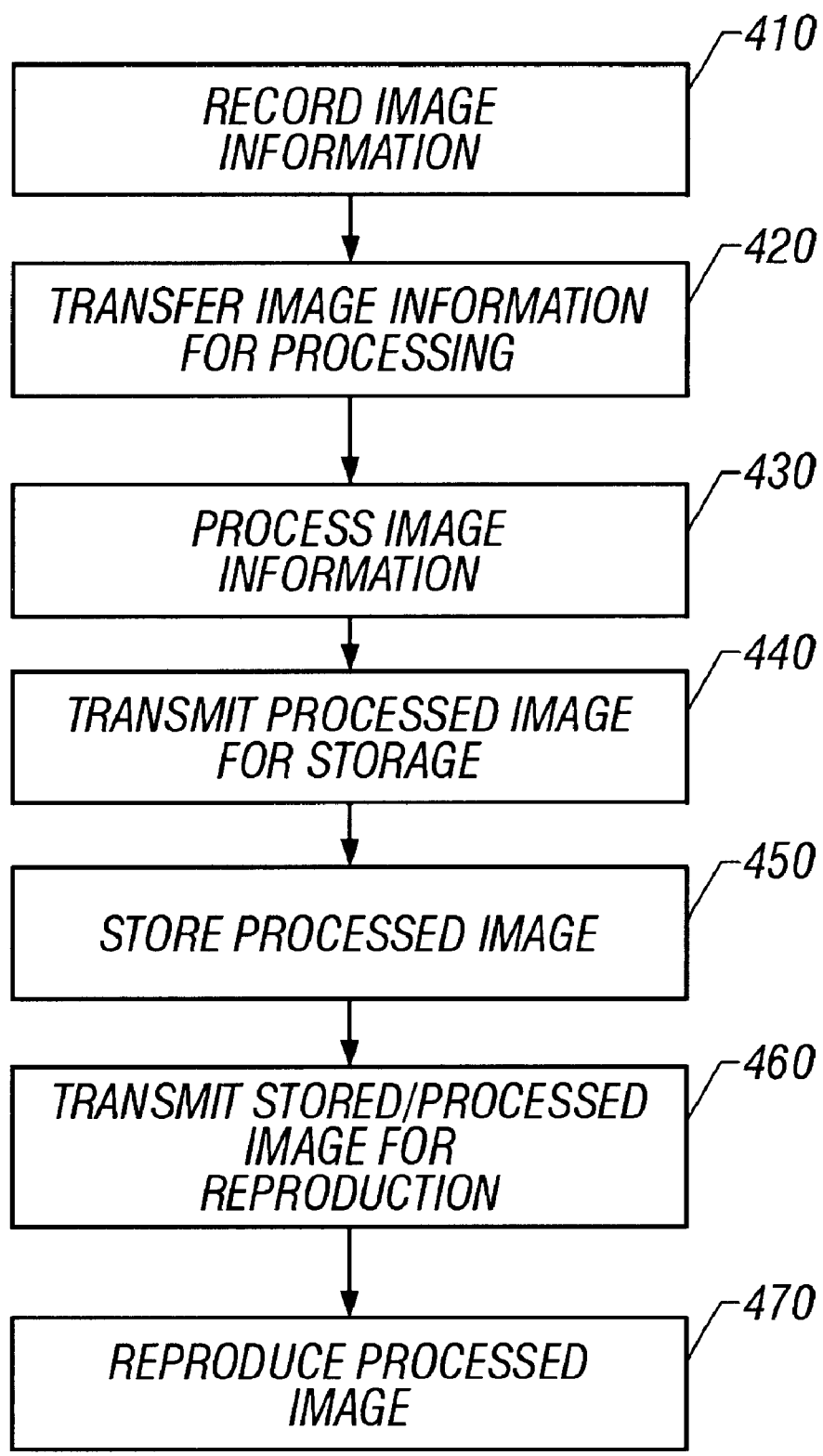
FIG. 6 is a flowchart illustrating a method according to one embodiment of the invention.

Specific examples of scanner station 400 architectures are illustrated in FIGS. 4B-1–4B-4. The scanning system 224 may comprise any illustrated example, combination of examples, or other suitable methods or systems for scanning the film 206 without departing from the scope and spirit of the invention.

FIG. 4B-1 illustrates one embodiment of a scanning station 400a having a transmission architecture. As illustrated, the transmission scanning station 400a comprises a lighting system 402a and a sensor system 404a. Lighting system 402a produces light 420a that is transmitted through the film 206 and measured by the sensor system 404a. The sensor system 404a produces sensor data 216a that is communicated to the image processing system 120.

Lighting system 402a and sensor system 404a are similar in design and function as lighting system 402 and sensor system 404, respectively. The visible light 420a may comprise broadband visible light, individual visible light colors, or combinations of visible light colors. In an embodiment in which the light 420a comprises broadband visible light, the sensor system 404a will preferably comprise a red, green and blue trilinear array. In this embodiment, the sensor system 404a can simultaneously measure the red, green and blue components of light 420a from the film 206. In another embodiment, the light 420a comprises pulses of red, green and blue light, and the sensor system 404a preferably comprises an unfiltered detector operable to measure the pulses of light 420a from the film 206. In this embodiment, the color of the light 420a changes and the sensor system 404a measures the respective light pulses from the film 206.

In one embodiment of the scanning station 400a, the light 420a produced by the lighting system 402a comprises visible light. The visible light 420a interacts with at least one dye cloud within the film 206 and any silver occlusions contained in the film 206. In particular, depending upon the embodiment of the development system 222, the film 206 may include silver forming an optical occlusion, such as metallic silver grains, silver halide, or both, but does not include silver compounds formed as a result of fixing the silver halide contained within the film 206.

The visible light 420a interacts with the magenta, cyan and yellow dye images within the film 206, as well as any silver occlusions within the film 206, the sensor system 404a records the intensity of visible light 420a from the film 206 and produces sensor data 216a. The sensor data 216a generally comprises a red, green, and blue record corresponding to the cyan, magenta, and yellow dye images, respectively. Depending upon the development process, each of the red, green, and blue records may include a silver record. Specifically, any metallic silver grains or silver halide within the film 206 partially occludes the visible light 420a transmitted through the film 206. Depending upon the severity of the occlusions, the red, green, and blue records are processed by the data processing system 102 to correct for the occlusion in the film 206.

In the preferred embodiment of the transmission scanning station 400a, the light 420a produced by the lighting system 402a comprises visible light and infrared light. As discussed above, the visible light may comprise broadband visible light, individual visible light colors, or combinations of visible light colors. The infrared light may comprise infrared, near infrared, or any suitable combination thereof The visible light 420a interacts with the dye images, i.e. cyan, magenta, or yellow, within the film 206 and any silver to produce a red, green, and/or blue record that includes a silver record. The infrared light interacts with the silver, and any other occlusions, within the film 206 and produces a silver record. The silver record can then be used to remove, at least in part, the effects of the occlusions contained in the red, green, and blue records. This embodiment is analogous to the defect correction electronic scanners described in U.S. Pat. No. 5,266,805, entitled System and Method for Image Recovery, which is hereby incorporated herein by reference. In this embodiment, any occlusions within the film are analogous to defects that obstruct the optical path of the infrared light. The degree of occlusion is used as a basis for modifying the color records. For example, in pixels having a high occlusion density, the individual color records are significantly increased, whereas in pixels having a low occlusion density, the individual color records are relatively unchanged.

In yet another embodiment of the transmission scanning station 400a, the light produced by the lighting system 402a comprises only infrared and/or near infrared light. In this embodiment, the infrared light 420a interacts with occlusions within the film 206 but does not substantially interact with the dye images within the film 206. In this embodiment, the sensor data 216a does not spectrally distinguish the magenta, cyan, and yellow dye images. An advantage of this embodiment is that the infrared light 420a does not fog the film 206. In a particular embodiment, the advantage of not fogging the film 206 allows the film 206 to be scanned at multiple development times without significantly fogging the film 206. In this embodiment, the scanning station 400a can be used to determine the optimal development time for the film 206. This embodiment may also be used to scan the silver image.

FIG. 4B-1 illustrates the light 420a being transmitted through the film 206 from the backside to the front side of the film 206. The light 420a can also be transmitted through the film 206 from the front side to the backside of the film 206 without departing from the scope of the invention.

FIG. 4B-2 illustrates one embodiment of a scanning station 400b having a reflection architecture. The reflective scanning station 400b comprises a lighting system 402b and a sensor system 404b. Lighting system 402b produces light 420b that is reflected from the film 206 and measured by the sensor system 404b. The scanning station 400b generally requires silver halide to be present within the film 206. The silver halide scatters and reflects the light 420b measured by the sensor system 404b. The sensor system 404b produces sensor data 216b, that is communicated to the image processing system 120. Lighting system 402b and sensor system 404b are similar to lighting system 402 and sensor system 404, respectively.

In one embodiment of the reflective scanning station 400b used to scan the blue emulsion layer of the film 206, the light 420b produced by the lighting system 402b comprises blue light. In this embodiment, the blue light 420b scans the silver and dye image within the blue layer of the film 206. The blue light 420b interacts with the yellow dye image and also the silver in the blue emulsion layer. In particular, the blue light 420b is reflected from the silver halide and measured by the sensor system 404b to produce a blue record. Many conventional films include a yellow filter below the blue emulsion layer that blocks the blue light 420a from illuminating the other emulsion layers of the film 206. As a result, noise created by cross-talk between the blue emulsion layer and the red and green emulsion layers is substantially reduced.

In another embodiment of the reflective scanning station 400b used to scan the blue emulsion layer of the film 206, the light 420b produced by the lighting system 402b comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 206. In this embodiment, the non-blue light 420b interacts with the silver image in the blue emulsion layer of the film 206, but is transparent to the yellow dye within the blue emulsion layer of the film 206. This embodiment is prone to higher noise levels created by cross-talk between the blue and green emulsion layers of the film 206.

In yet another embodiment of the reflective scanning station 400b, the light 420b produced by the lighting system 402b comprises visible and infrared light. In this embodiment, blue light interacts with the yellow dye image and the silver image in the blue emulsion layer, green light interacts with magenta dye image and the silver in each of the emulsion layers, red light interacts with the cyan dye image and the silver in each of the emulsion layers, and the infrared light interacts with the silver in each emulsion layer of the film 206. In this embodiment, the sensor system 404b generally comprises a filtered detector 410b (not expressly shown) that measures the red, green, blue, and infrared light 420b from the film 206 to produce red, green, blue, and infrared records as sensor data 216b.

Although the scanning station 400b is illustrated with the lighting system 402b and the sensor system 404b located on front side of the film 206, the lighting system 402b and the sensor system 404b may also be located on the back side of the film 206. In this embodiment, the light 420b produced by the lighting system 402b may comprise red light. The red light largely interacts with the cyan dye image and silver in the red emulsion layer of the film 206 to produce a red record of the sensor data 216b.

FIG. 4B-3 illustrates one embodiment of a scanning station 400c having a transmission-reflection architecture. The transmission-reflection architecture is the preferred embodiment of the scanning system 224. In this embodiment, the scanning station 400c comprises a first lighting system 402c, a second lighting system 402d, and a sensor system 404c. In the preferred embodiment, the lighting system 402c operates to illuminate the front side of the film 206 with light 420c, the second lighting system 402d operates to illuminate the backside of the film 206 with light 420d, and the sensor system 404c operates to measure the light 420c reflected from the film 206 and the light 420d transmitted through the film 206. Based on the measurements of the light 420b, 420d, the sensor system 404c produces sensor data 216c that is communicated to the data processing system 102. Lighting system 402c and 402d are similar to lighting system 402, and sensor system 404c is similar to the sensor system 404. Although scanning station 400c is illustrated with lighting systems 402c, 402d, a single light source may be used to produce light that is directed through a system of mirrors, shutters, filters, and the like, to illuminate the film 206 with the front side of the film 206 with light 420c and illuminate the back side of the film 206 with light 420d. The light 420c, 420d may comprise any color or color combinations, including infrared light.

This embodiment of the scanning station 400c utilizes many of the positive characteristics of the transmission architecture scanning station 400a and the reflection architecture scanning station 400b. For example, the blue emulsion layer is viewed better by light 420c reflected from the film 206 than by light 420d transmitted through the film 206; the green emulsion layer is viewed better by light 420d transmitted through the film 206 than by light 420c reflected from the film 206; and the red emulsion layer is adequately viewed by light 420d transmitted through the film 206. In addition, the cost of the scanning station 400c is minimized through the use of a single sensor system 404c.

In the preferred embodiment of the scanning station 400c, the light 420c comprises blue light, and light 420d comprises red, green, and infrared light. The blue light 420c interacts with the yellow dye image and silver in the blue emulsion layer of the film 206. The sensor system 404c measures the light 420c from the film 206 and produces a blue-silver record. The red and green light 420d interacts with the cyan and magenta dye images, respectively, as well as the silver in the film 206. The infrared light 420d interacts with the silver, but does not interact with the dye clouds within the film 206. As discussed previously, the silver contained within the film 206 may comprise silver grains, silver halide, or both. The red, green, and infrared light 420d transmitted through the film 206 is measured by the sensor system 404c, which produces a red-silver, green-silver, and silver record. The blue-silver, red-silver, green-silver, and silver records form the sensor data 216*c* that is communicated to the image processing system 120. The image processing system 120 utilizes the silver record to facilitate removal of the silver component from the red, green, and blue records.

In another embodiment, the light 420*c* comprises blue light and infrared light, and light 420*d* comprises red, green, and infrared light. As discussed previously, the blue light 420*c* mainly interacts with the yellow dye image and silver within the blue emulsion layer of the film 206. The infrared light 420*c* interacts with mainly the silver in the blue emulsion layer of the film 206. The sensor system 404*c* measures the blue and infrared light 420*c* from the film 206 and produces a blue-silver record and a front side silver record, respectively. The red, green, and infrared light 420*d* interact with the film 206 and are measured by the sensor system 404*c* to produce red-silver, green-silver and transmitted-silver records as discussed above. The blue-silver, red-silver, green-silver, and both silver records form the sensor data 216*c* that is communicated to the image processing system 120. In this embodiment, the image processing system 120 utilizes the front side silver record of the blue emulsion layer to facilitate removal of the silver component from the blue-silver record, and the transmission-silver record is utilized to facilitate removal of the silver component from the red and green records.

Although the scanning station 400*c* is described in terms of specific colors and color combinations of light 420*c* and light 420*d*, the light 420*c* and light 420*d* may comprise other suitable colors and color combinations of light without departing from the scope of the invention. For example, light 420*c* may comprise non-blue light, infrared light, broadband white light, or any other suitable light. Likewise, light 420*d* may include blue light, broadband white light, or another other suitable light. Scanning station 400*c* may also comprise other suitable embodiments without departing from the scope of the invention. For example, although the scanning station 400*c* is illustrated with two lighting systems 402 and a single sensor system 404, the scanning station 400*c* could be configured with a single lighting system 402 and two sensor systems 404, wherein one sensor system measures light 420 reflected from the film 206 and the second sensor system 404 measures light 420 transmitted through the film 206. In addition, as discussed above, the scanning station 400 may comprise a single lighting system that illuminates the film 206 with light 420*c* and light 420*d*.

FIG. 4B-4 illustrates an embodiment of a scanning station 400*d* having a reflection-transmission-reflection architecture. In this embodiment, the scanning station 400*d* comprises a first lighting system 402*e*, a second lighting system 402*f*, a first sensor system 404*e*, and a second sensor system 404*f*. In the embodiment illustrated, the lighting system 402*e* operates to illuminate the front side of the film 206 with light 420*e*, and the second lighting system 402*f* operates to illuminate the back side of the film 206 with light 420*f*. The first sensor system 404*e* operates to measure the light 420*e* reflected from the film 206 and the light 420*f* transmitted through the film 206, and the second sensor system 404*f* operates to measure the light 420*f* reflected from the film 206 and the light 420*e* transmitted through the film 206. Based on the measurements of the light 420*e* and 420*f*, the sensor systems 404*e*, 404*f* produce sensor data 216*ef* that is communicated to the image processing system 120. Lighting systems 402*e*, 402*f* are similar to lighting systems 402, and sensor systems 404*e*, 404*f* are similar to the sensor system 404. Although scanning station 400*d* is illustrated with lighting systems 402*e*, 402*f*, and sensor systems 404*e*, 404*f*, a single lighting system and/or sensory system, respectively, may be used to produce light that is directed through a system of mirrors, shutters, filters, and the like, to illuminate the film 206 with the front side of the film 206 with light 420*e* and illuminate the backside of the film 206 with light 420*f*.

This embodiment of the scanning station 400*d* expands upon the positive characteristics of the transmission-reflection architecture of scanning station 400*c*. For example, as discussed in reference to FIG. 4B-3, the blue emulsion layer is viewed better by light 420*e* reflected from the film 206 and the green emulsion layer is viewed better by light 420*e* or 420*f* transmitted through the film 206. Second sensor system 404*f* allows viewing of the red emulsion layer by light 420*f* reflected from the film 206, which generally produces better results than viewing the red emulsion layer by light 420*e* or light 420*f* transmitted through the film 206.

In one embodiment of the scanning station 400*d*, the light 420*e* and 420*f* comprises light within the infrared portion of the electromagnetic spectrum. In this embodiment, the sensor system 404*e* measures light 420*e* reflected from the front emulsion layer and light 420*f* transmitted through the film 206. The sensor system 404*f* measures light 420*f* reflected from the back emulsion layer and light 420*e* transmitted through the film 206. In general, the front measurement corresponds to the blue signal, the back measurement corresponds to the red signal, and the through measurement minus the front and back measurement corresponds to the green signal. In this embodiment, cross-talk exists between the emulsion layers, as the emulsion layers are not spectrally unique using infrared light.

In the preferred embodiment of the scanning station 400*d*, the sensor systems 404*e*, 404*f* include a trilinear array of filtered detectors, and the light 420*e* and the light 420*f* comprises broadband white light and infrared light. The trilinear array operates to simultaneously measure the individual red, green, and blue components of the broadband white light 420*e*, 420*f*. The infrared light is measured separately and can be measured through each filtered detector 410 of the sensor systems 404*e*, 404*f*. The broadband white light 420*e*, 420*f* interacts with the silver and magenta, cyan, and yellow color dyes in the film 206, respectively, and the infrared light 420*e*, 420*f* interacts with the silver within the film 206. The reflected white light 420*e* measured by the first sensor system 404*e* includes information corresponding to the yellow dye image and the silver in the blue emulsion layer of the film 206. In particular, the blue component of the broadband white light 420*e* measured by the blue detector of the sensor system 404*e* corresponds to the yellow dye image, and the non-blue components of the broadband white light 420*e* measured by the red and green detectors corresponds to the red and green dye images and all the silver within the emulsion layers of the film 206. Similarly, the red component of the broadband white light 420*f* measured by the red detector of the sensor system 404*f* corresponds largely to the cyan dye image, and the non-red components of the broadband white light 420*e* measured by the blue and green detectors corresponds to the yellow and magenta dye images and all the silver within the emulsion layers of the film 206. The white light 420*e*, 420*f* transmitted through the film 206 interacts with each color dye image and silver within the film 206, and the red, green, and blue light components are measured by the red, green, and blue detectors of the sensor systems 404*e*, 404*f* to produce individual red, green and blue light records that include the silver record. The infrared light 420*e* reflected from the film 206 and measured by the sensor system 404*e* corresponds largely to the silver in the blue emulsion layer of the film 206, and the infrared light 420f reflected from the film 206 and measured by the sensor system 404f largely corresponds to the silver in the red emulsion layer of the film 206. The infrared light 420e, 420f transmitted through the film 206 measured by the sensor systems 404e, 404f corresponds to the silver in the red, green, and blue emulsion layers of the film 206. The individual measurements of the sensor systems 404e, 404f are communicated to the image processing system 120 as sensor data 216ef. The image processing system 120 processes the sensor data 216ef and constructs the digital image 208 using the various sensor system measurements. For example, the blue signal value for each pixel can be calculated using the blue detector data from the reflected light 420e and the blue detector data from the transmitted light 420f, as modified by non-blue detector data from the reflected light 420e, and the non-blue detector data from the transmitted light 420e or 420f. The red and green signal values for each pixel can be similarly calculated using the various measurements.

In another embodiment of the scanning station 400d, the sensor systems 404e, 404f include a trilinear array of filtered detectors, and the light 420e and the light 420f comprises broadband white light. This embodiment of the scanning station 400d operates in a similar manner as discussed above, with the exception that infrared light is not measured or used to calculate the digital image 208.

Although the scanning station 400d is described in terms of a specific colors and color combinations of light 420e and light 420f, the light 420e and light 420f may comprise other suitable colors and color combinations of light without departing from the scope of the invention. Likewise, the scanning station 400d may comprise other suitable devices and systems without departing from the scope of the invention.

FIG. 3 illustrates one embodiment of the image processing system 120. In this embodiment, image processing system 120 comprises a random access memory (RAM) 515, read-only memory (ROM) 520 wherein the ROM 520 could also be erasable programmable read-only memory (EPROM) or electrically erasable programmable read-only memory (EEPROM), and input/output (I/O) adapter 525 for connecting peripheral devices such as disk units 530 and tape drives 535 to system bus 510, a user interface adapter 540 for connecting keyboard 345, mouse 350, speaker 355, microphone 360, and/or other user interface devices to system bus 310, communications interface 365 for connecting image processing system 300 to an information network such as the Internet, and display adapter 370 for connecting system bus 310 to a display device such as monitor 375. Mouse 350 has a series of buttons 380, 385 and is used to control a cursor shown on monitor 375. It will be understood that image processing system 300 may comprise other suitable sub-systems and peripherals without departing from the scope of the present invention.

Referring next to FIG. 4, a flow chart according to one embodiment of the present invention is shown. The illustrated method begins by recording image information in step 410, and presupposes that a film has been introduced into an imaging system such as the one illustrated in FIG. 1. The recorded image information includes at least one electronic representation of the image formed on the film. In at least one embodiment, the film is developed, and multiple electronic representations of the image formed on the film are recorded during different stages of film development.

Preferably, at some time before the recorded images are processed, a customer will provide any necessary processing, billing, and delivery information. Some of the information, such as billing information, should be requested at the time film is deposited for processing. Other information, however, can be provided later. For example, the quantity of prints, special processing options, delivery information, and changes to billing information necessitated by newly requested processing or servicing may be provided later. Preferably, a customer may provide any necessary information via an Internet web site maintained according to the present invention.

Information associated with the recorded images is then transmitted for processing in step 420. The information transmitted includes, but is not limited to, raw (originally recorded) image data, partly processed image data, client requests for image modification, location of film deposit, desired pick-up location, desired type of media encoding (e.g. prints, negatives, floppy disk, compact disk, etc.), payment and billing information, etc. The information may be transmitted via the Internet, phone lines, local or wide area networks, wireless networks, fiber optic networks, or other suitable communication channels. Preferably, the information is transmitted either directly or indirectly to image processing system 120 during off-peak hours. However, as noted earlier, the information may be transmitted for storage, rather than being transmitted directly to a processing site, and may be transmitted at any time.

Processing of the image is performed in step 430. Using the information transmitted in step 420 (including information that may have be received via the Internet after the film was initially deposited), an electronic representation of a desired image is generated. The processing may include stitching together multiple electronic images, performing customer requested image alterations, removing or reducing image artifacts using defect maps, and the like. It will be appreciated that although step 430 produces fully processed electronic representations of desired images, some additional processing may be performed when the images are delivered.

The method proceeds to step 440, where information associated with the fully processed desired image is transmitted for storage. This step is similar to step 420, except that in addition to (or in place of) the raw originally recorded or partially processed image information transmitted in step 420, step 440 transmits fully processed image information for storage.

The information associated with the processed image (which includes the electronic representation of a desired image) is stored during step 450. Preferably this information is stored in a separately maintained database or archive, but may be stored temporarily or permanently in a database maintained as part of the processing system. Information is maintained in storage until requested by a customer, or until the data is no longer needed. When the information is requested by a customer, step 460 transmits the information for reproduction and/or delivery to a customer. It should be noted that if the raw originally recorded image data is archived along with the desired electronic image, an additional processing step (not illustrated) may be performed prior to delivery of the images to a customer. In addition, if the customer requests (preferably via an Internet web site and/or a user interface maintained as part of an image delivery system) that a particular image and its associated information be archived, additional processing can be performed at any time before the information is deleted from the database.

The last step in the illustrated method is step 470. In step 470, the information transmitted in step 460 is used to generate negative or positive film images, photographic prints, electronic copies, etc., and dispense these images to a customer. Ideally, a user interface is provided that allows customers to preview the images before they are encoded and dispensed, and/or perform minor alterations to the way the image is encoded onto a physical medium. For example, a desired image may be previewed on a computer screen, and cropped, lightened, darkened etc., as desired by the customer. The act of accessing, previewing, manipulating, and dispensing images may be done by the customer via the Internet. In one embodiment, a customer accesses an Internet web site, calls up the desired images, makes whatever modifications to the images he desires, and requests the images to be downloaded to his computer. Alternatively, a customer may request via the Internet or otherwise, that negative or positive film images, photographic prints, electronic copies, etc., be delivered to him, or a third party.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A DFP system comprising:
   at least a first communications interface, said at least a first communications interface to receive image information requiring further processing from at least one remotely located DFP imaging system and to transmit processed information to at least one image delivery system;
   at least one processor operably associated with said at least a first communications interface;
   memory operably associated with said processor; and
   a program of instructions capable of being stored in said memory and executed by said processor, said program of instructions enabled to manipulate said received image information to generate a processed electronic representation of a desired image.

2. The system as in claim 1, further comprising a user interface, said user interface configured to receive information associated with said received image information.

3. The system as in claim 1, further comprising an image collection system, said image collection system comprising:
   at least one detector, said detector enabled to generate electrical signals in response to light, and said detector further enabled to output said electrical signals for image processing;
   at least one illumination source enabled to illuminate at least a portion of a film having images formed thereon, such that light traveling from said film strikes said at least one detector; and
   a second communications interface, said second communications interface capable of transmitting image information requiring further processing to said at least a first communications interface.

4. The system as in claim 1, wherein said image information is recorded using digital film processing techniques.

5. The system as in claim 1, wherein image information includes originally recorded image data.

6. The system as in claim 1, wherein said image information includes partially processed image data.

7. The system as in claim 1, further comprising an image delivery system, said image delivery system comprising:
   a customer interface capable of accepting customer input and providing feedback;
   a second communications interface capable of receiving a processed electronic representation of a desired image, transmitted by said at least a first communications interface; and
   wherein said image delivery system is enabled to encode a physical medium with a representation of said desired image.

8. The system as in claim 7, further comprising at least one drive configured to accept removable computer readable media, and wherein encoding a physical medium with a representation of said desired image includes encoding said desired image onto a computer readable medium.

9. The system as in claim 7, wherein said image delivery system further comprises a printer, and wherein encoding a physical medium with a representation of said desired image includes printing said desired image as a negative film image.

10. The system as in claim 7, wherein said image delivery system further comprises a printer, and wherein encoding a physical medium with a representation of ad desired image includes printing said desired image as a positive film image.

11. The system as in claim 7, wherein said image delivery system further comprises a printer, and wherein encoding a physical medium with a representation of said desired image includes printing said desired image as a photographic print.

12. The system as in claim 1, wherein said image delivery system is an information handling system capable of receiving, via the internet, information transmitted by said at least a first communications interface.

13. The system as in claim 1, further comprising a non-volatile storage medium capable of storing said received image information.

14. A method of processing digital film images, the method comprising:
   scanning a film having an image formed thereon;
   recording at least one electronic representation of the image, the at least one electronic representation requiring further processing before being suitable for viewing;
   transmitting information associated with the at least one electronic representation to a remote processing system;
   processing the transmitted information to generate a processed electronic representation of a desired image; and
   transmitting the processed electronic representation of a desired image to an image delivery system.

15. The method as in claim 14, further comprising encoding the electronic representation of the desired image onto a computer readable medium.

16. The method as in claim 14, further comprising printing the desired image as a negative film image.

17. The method as in claim 14, further comprising printing the desired image as a positive film image.

18. The method as in claim 14, further comprising printing the desired image as a photographic print.

19. The method as in claim 14, further comprising developing the film.

20. The method as in claim 19, further comprising scanning the film at a plurality of different times during development.

21. The method as in claim 14, further comprising partially processing the at least one electronic representation, and wherein the information associated with the at least one electronic representation includes the partially processed at least one electronic representation.

22. The method as in claim 14, wherein transmitting includes the transmission of information via at least one of the following communication channels: fiber optic lines, telephone lines, coaxial cables, cellular communication links, personal communication system (PCS) links, or satellite transmission links.

23. A distributed DFP system comprising:
   an imaging system to record electronic representations of images formed on film and to transmit said electronic representations for processing, said electronic representations requiring further processing before being suitable for viewing;
   an image processing system capable of receiving said transmitted electronic representations, and further capable of manipulating said transmitted electronic representations to generate a processed electronic representation of a desired image, said processing system further capable of transmitting said processed electronic representation of a desired image for storage;
   a database enabled to store said processed electronic representation of a desired image, and to transmit said processed electronic representation of a desired image for delivery; and
   an image delivery system enabled to receive said processed electronic representation of a desired image, and to encode a physical medium with a representation of said desired image.

24. The system as in claim 23, wherein encoding a physical medium with a representation of said desired image includes encoding said electronic representation of a desired image onto a computer readable medium.

25. The system as in claim 23, wherein said image delivery system further comprises a printer, and encoding a physical medium with a representation of said desired image includes printing the desired image on photographic print paper.

26. The system as in claim 23, wherein said image delivery system further comprises a printer, and encoding a physical medium with a representation of said desired image includes printing the desired image on film.

27. The system as in claim 23, wherein said image delivery system is an information handling system enabled to receive said electronic representation of a desired image via the Internet.

28. The system as in claim 23, wherein said database is maintained separate from said image processing system.

29. The system as in claim 23, wherein said imaging system is a digital film processing system.

30. ;The method as in claim 23, wherein transmitting includes the transmission of information via at least on of the following communication channels: fiber optic lines, telephone lines, coaxial cables, cellular communication links, personal communication system (PCS) links, or satellite transmission links.

31. A DFP system comprising:
   an image capturing system enabled to record a plurality of electronic representations of an image formed on film, said electronic representations requiring further processing before being suitable for viewing;
   an image processing system capable of manipulating said plurality of electronic representations of an image formed on film to generate a processed electronic representation of a desired image; and
   at least one communications interface enabled to receive and transmit information via the Internet, said information including information associated with said desired image.

32. The system as in claim 31, further comprising a database, said database enabled to store at least said electronic representation of a desired image.

33. The system as in claim 31, wherein said image capturing system is configured to record said plurality of electronic representations using infra-red (IR) light.

34. The system as in claim 31, wherein said image capturing system is configured to record said plurality of electronic representations using multiple light spectrums.

35. The system as in claim 31, wherein said image processing system comprises:
   at least one processor;
   memory operably associated with said processor; and
   a program of instructions, said program of instructions capable of being stored in said memory and executed by said processor, and wherein said program of instructions is enabled to manipulate said plurality of electronic representations of an image formed on film to generate an electronic representation of a desired image.

36. The system as in claim 35, wherein said program of instructions is further enabled to maintain an Internet web page.

37. The system as in claim 31, wherein said image capturing system and said image processing system are maintained in a distributed configuration.

38. The system as in claim 31, wherein said communications interface is further enabled to deliver said electronic representation of a desired image via e-mail.

39. The system as in claim 31, further comprising an image delivery system, said image delivery system capable of encoding a physical medium with a representation of said desired image.

40. The system as in claim 39, wherein encoding includes printing said desired image onto a physical medium.

41. A method of delivering images resulting from DFP, the method comprising:
   recording a plurality of electronic representations of an image formed on a film, said electronic representations requiring further processing before being suitable for viewing;
   processing the plurality of electronic representations to generate a processed electronic representation of a desired image; and
   delivering the electronic representation of the desired image via the Internet.

42. The method as in claim 41, further comprising storing the electronic representation of a desired image in a database.

43. The method as in claim 41, further comprising maintaining an Internet web page, and wherein delivering includes transmitting information in response to a user action initiated via the Internet web page.

44. The method as in claim 41, wherein delivering the electronic representation includes sending the electronic representation via e-mail.

45. The method as in claim 41, further comprising receiving user input via the Internet, and wherein processing includes altering the electronic representation of a desired image in accordance with the received user input.

46. The method as in claim 41, further comprising receiving and delivering, via the Internet, information associated with the electronic representation of a desired image.

47. The method as in claim 46, wherein information associated with the electronic image includes at least one of the following: billing information, payment information, image identification information, address information, service selection options, archive information, and image processing options.

48. A signal embodied in a propagation medium, said signal comprising:
- at least one instruction enabled to record a plurality of electronic representations of an image formed on a film, said electronic representations requiring further processing before being suitable for viewing;
- at least one instruction enabled to process the plurality of electronic representations to generate a processed electronic representation of the desired image via the Internet.

49. The signal as in claim 48, further comprising at least one instruction enabled to store the electronic representation of a desired image in a database.

50. The signal as in claim 48, further comprising at least one instruction enabled to maintain an Internet web page, and wherein said delivering includes transmitting information in response to a user action initiated via the Internet web page.

51. The signal as in claim 48, wherein said at least one instruction enabled to deliver includes at least one instruction enabled to send the electronic representation via e-mail.

52. The signal as in claim 48, further comprising at least one instruction enabled to receive user input via the Internet, and wherein said at least one instruction enabled to process includes at least one instruction enabled to alter the electronic representation of a desired image in accordance with the received user input.

53. The signal as in claim 48, further comprising at least one instruction enabled to receive and deliver, via the Internet, information associated with the electronic representation of a desired image.

54. The signal as in claim 53, wherein information associated with the electronic image includes at least one of the following: billing information, payment information, image identification information, address information, service selection options, archive information, and image processing options.

55. A storage and retrieval system for electronic images, said system comprising:
- a plurality of electronic image archives, said plurality of image archives enabled to store electronic images recorded from film and information associated with said electronic images;
- a plurality of image delivery systems, said plurality of image delivery systems enabled to encode physical media with representations of said electronic images; and wherein
- at least one of said plurality of image delivery systems includes at least one of said plurality of electronic image archives.

56. The system as in claim 55, wherein at least one of said image delivery systems comprises a user interface.

57. The system as in claim 55, wherein at least one of said image delivery systems comprises a printer, and wherein encoding a physical medium includes printing an image on photographic paper.

58. The system as in claim 55, wherein at least one of said image delivery systems comprises a printer, and wherein encoding a physical medium includes printing an image on film.

59. The system as in claim 55, wherein at least one of said image delivery systems comprises at least one drive configured to accept removable storage media, and wherein encoding a physical medium includes encoding copies of electronic images onto said removable storage media.

60. The system as in claim 55, wherein at least one of said image delivery systems is enabled to deliver electronic images via the Internet.

61. The system as in claim 55, wherein said image archives comprise:
- at least one processor;
- memory operably associated with said processor;
- at least on non-volatile storage medium, said non-volatile storage medium enabled to store a plurality of said electronic images and said information associated with said electronic images; and
- a program of instructions capable of being stored in said memory and executed by said processor, said program of instructions configured to store and retrieve, from said at least one non-volatile storage medium, said electronic images and said information associated with said electronic images.

62. The system as in claim 55, wherein said plurality of electronic image archives are enabled to operate as a single distributed database.

* * * * *